US012568308B2

(12) United States Patent
Xu

(10) Patent No.: US 12,568,308 B2
(45) Date of Patent: Mar. 3, 2026

(54) PHOTOGRAPHING FRAME RATE CONTROL METHOD, ELECTRONIC DEVICE, CHIP SYSTEM, AND READABLE STORAGE MEDIUM

(71) Applicant: HONOR DEVICE CO., LTD., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 36 days.

(21) Appl. No.: 18/839,757

(22) PCT Filed: Aug. 14, 2023

(86) PCT No.: PCT/CN2023/112906
§ 371 (c)(1),
(2) Date: Aug. 20, 2024

(87) PCT Pub. No.: WO2024/093432
PCT Pub. Date: May 10, 2024

(65) Prior Publication Data
US 2025/0150707 A1     May 8, 2025

(30) Foreign Application Priority Data
Oct. 31, 2022     (CN) .......................... 202211350405.9

(51) Int. Cl.
| | |
|---|---|
| *H04N 23/667* | (2023.01) |
| *H04N 23/65* | (2023.01) |
| *H04N 23/71* | (2023.01) |
| *H04N 23/73* | (2023.01) |

(52) U.S. Cl.
CPC ........... *H04N 23/667* (2023.01); *H04N 23/65* (2023.01); *H04N 23/71* (2023.01); *H04N 23/73* (2023.01)

(58) Field of Classification Search
CPC ...... H04N 23/667; H04N 23/65; H04N 23/71; H04N 23/73; H04N 23/62; Y02D 30/70
See application file for complete search history.

(56) References Cited

U.S. PATENT DOCUMENTS

| | | | |
|---|---|---|---|
| 8,154,606 | B2 | 4/2012 | Tokuyama |
| 9,197,809 | B2 | 11/2015 | Kosaka et al. |
| 9,313,376 | B1 * | 4/2016 | Bertolami .......... H04N 23/6815 |
| 9,582,061 | B2 | 2/2017 | Pylappan et al. |

(Continued)

FOREIGN PATENT DOCUMENTS

| | | |
|---|---|---|
| CN | 101529890 A | 9/2009 |
| CN | 102780869 A | 11/2012 |

(Continued)

*Primary Examiner* — Jason A Flohre

(57) ABSTRACT

This application is applicable to the field of terminal technologies, and provides a photographing frame rate control method, an electronic device, and a readable storage medium. In the photographing frame rate control method in this application, an electronic device may detect a first operation on a first control in a display interface; a frame rate strategy decision layer determines a target frame rate strategy based on initial data in response to the first operation; and the frame rate strategy decision layer generates a decision instruction based on the target frame rate strategy, where the decision instruction is used to control photographing frame rates of a plurality of cameras.

20 Claims, 13 Drawing Sheets

(56)                    References Cited

U.S. PATENT DOCUMENTS

| | | | |
|---|---|---|---|
| 11,800,221 B2 | 10/2023 | Yang et al. | |
| 11,818,497 B2 | 11/2023 | Li et al. | |
| 11,962,932 B2 | 4/2024 | Li | |
| 2017/0359549 A1 | 12/2017 | Baran et al. | |
| 2018/0070009 A1 | 3/2018 | Baek et al. | |
| 2018/0367752 A1* | 12/2018 | Donsbach | H04N 23/667 |
| 2020/0275050 A1 | 8/2020 | Pytlarz et al. | |
| 2023/0055623 A1 | 2/2023 | Qiuyang | |
| 2023/0188840 A1* | 6/2023 | Kang | H04N 23/90 |
| | | | 348/220.1 |
| 2023/0308744 A1* | 9/2023 | Hoshina | H04N 23/45 |
| 2023/0319414 A1 | 10/2023 | Yang | |
| 2023/0328356 A1 | 10/2023 | Wu et al. | |
| 2024/0185775 A1 | 6/2024 | Zhang et al. | |
| 2025/0301221 A1* | 9/2025 | Feng | H04N 23/684 |

FOREIGN PATENT DOCUMENTS

| | | | |
|---|---|---|---|
| CN | 104135607 A | 11/2014 | |
| CN | 105611139 A | 5/2016 | |
| CN | 107454322 A | 12/2017 | |
| CN | 108322650 A | 7/2018 | |
| CN | 109327626 A | 2/2019 | |
| CN | 110881136 A | 3/2020 | |
| CN | 111526314 A | 8/2020 | |
| CN | 112532857 A | 3/2021 | |
| CN | 113411529 A | 9/2021 | |
| CN | 113422902 A | 9/2021 | |
| CN | 114339042 A | 4/2022 | |
| CN | 114648951 A | 6/2022 | |
| CN | 114745502 A | 7/2022 | |
| CN | 115086567 A | 9/2022 | |
| CN | 115134516 A | 9/2022 | |
| CN | 116347224 A | 6/2023 | |
| EP | 4064689 A1 | 9/2022 | |
| JP | 2004205792 A | 7/2004 | |
| WO | 2013165377 A1 | 11/2013 | |
| WO | 2020073959 A1 | 4/2020 | |
| WO | 2021052292 A1 | 3/2021 | |
| WO | 2021073331 A1 | 4/2021 | |
| WO | 2021203996 A1 | 10/2021 | |
| WO | 2021223500 A1 | 11/2021 | |

* cited by examiner (a)

(b)

| Zoom ratio | Ambient brightness | Dynamic range | Status information | Scene type | Sensing module parameter |
|---|---|---|---|---|---|
| [1.0, 4.0) | High brightness | High dynamic | Jitter state | All scenes | DCG 30 fps |
| | | | Still state | Light blinking | Binning 60 fps |
| | | | | Light invariant | DCG 30 fps |
| | | Low dynamic | Jitter state | All scenes | Binning 30 fps |
| | | | Still state | Light blinking | Binning 60 fps |
| | | | | Light invariant | Binning 30 fps |
| | Low brightness | All scenes | All scenes | All scenes | Binning 30 fps |

FIG. 9

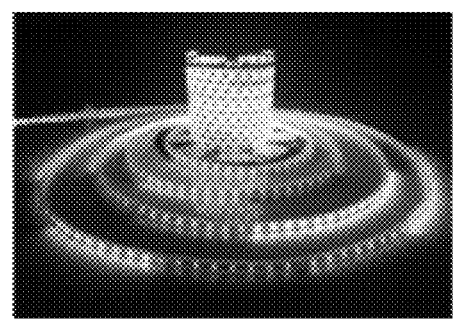

(a)

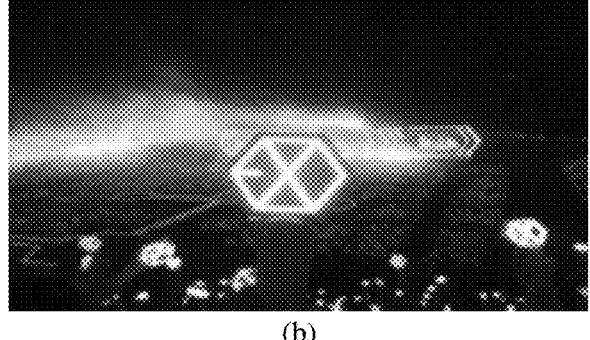

PHOTOGRAPHING FRAME RATE CONTROL METHOD, ELECTRONIC DEVICE, CHIP SYSTEM, AND READABLE STORAGE MEDIUM

CROSS-REFERENCE TO RELATED APPLICATIONS

This application is a National Stage of International Application No. PCT/CN2023/112906, filed on Aug. 14, 2023, which claims priority to Chinese Patent Application No. 202211350405.9, filed on Oct. 31, 2022, both of which are hereby incorporated by reference in their entireties.

TECHNICAL FIELD

This application relates to the field of terminal technologies, and in particular, to a photographing frame rate control method, an electronic device, a chip system, and a readable storage medium.

BACKGROUND

With continuous development of functions of an electronic device, photographing performance of the electronic device is also increasingly high. Through mounting of a plurality of cameras on the electronic device, more photographing modes can be provided for a user to select and use.

Generally, when a photographing environment is in good condition, photographing may be performed at a high frame rate to achieve a better photographing effect; or otherwise, photographing is performed at a low frame rate. However, the use of the high frame rate leads to an increase in power consumption. Currently, when performing photographing by using the electronic device, the user can perform photographing only based on a fixed frame rate mode for the device. In addition, services related to a plurality of cameras are associated with and coupled to a hardware platform of the electronic device. As the plurality of cameras have more frame rate matching solutions based on different photographing environments and running power consumption, matching logic of the plurality of cameras corresponding to different photographing scenes is increasingly complex, and this brings great difficulties to subsequent function expansion and maintenance.

SUMMARY

This application provides a photographing frame rate control method, an electronic device, a chip system, and a readable storage medium. Adaptation logic of photographing frame rates of a plurality of cameras is decoupled from a hardware platform, so that subsequent function expansion and maintenance for control over the photographing frame rate can be facilitated.

To achieve the foregoing objective, the following technical solutions are used in this application:

According to a first aspect, a photographing frame rate control method is provided, and is applied to an electronic device including a frame rate strategy decision layer and a plurality of cameras, and the method may include:

the electronic device detects a first operation on a first control in a display interface; the frame rate strategy decision layer may determine a target frame rate strategy based on initial data in response to the first operation; and the frame rate strategy decision layer may further generate a decision instruction based on the target frame rate strategy, where the decision instruction is used by the electronic device to control photographing frame rates of the plurality of cameras.

In the foregoing manner, the frame rate strategy decision layer is disposed at a hardware abstraction layer, to decouple configuration logic for controlling the photographing frame rates of the plurality of cameras from a hardware platform, so that subsequent function expansion and maintenance are facilitated.

In a possible implementation of the first aspect, the frame rate strategy decision layer includes an interface matching module, a frame rate strategy calculation module, and a frame rate strategy control module that are connected in sequence, the interface matching module is further connected to the frame rate strategy control module, the frame rate strategy decision layer further includes a frame rate strategy parsing module, and the frame rate strategy parsing module is connected to the frame rate strategy calculation module; and the method includes:

the interface matching module obtains the initial data, where the initial data includes at least one of sensing data or control data;

the frame rate strategy parsing module parses a frame rate strategy configuration to obtain a plurality of frame rate strategies;

the frame rate strategy calculation module determines, from the plurality of frame rate strategies based on the initial data, the target frame rate strategy that matches the initial data, where the target frame rate strategy is one of the plurality of frame rate strategies;

the frame rate strategy control module generates the decision instruction based on the target frame rate strategy; and the interface matching module outputs the decision instruction.

In the foregoing manner, based on a multi-camera infrastructure and by using the frame rate strategy parsing module, the frame rate strategy calculation module, and the frame rate strategy control module, adjustment and control of photographing frame rates corresponding to different sensing states can be supported in different scenarios; configuration logic for controlling the photographing frame rates of the plurality of cameras is decoupled from the hardware platform, and matching calculation and output control of the photographing frame rates are implemented by using a plurality of modules, so that advantages such as applicability and portability across chip platforms are possessed; and in addition, the disposed frame rate strategy calculation module may adjust the photographing frame rate based on the sensing data or the control data, and can balance running power consumption of the plurality of cameras in a photographing process, so that use time of the electronic device can be prolonged.

In a possible implementation of the first aspect, the frame rate strategy decision layer further includes a first conversion module and a second conversion module, the first conversion module is connected between the interface matching module and the frame rate strategy calculation module, and the second conversion module is connected between the interface matching module and the frame rate strategy control module;

after the interface matching module obtains the initial data, the method further includes:

the first conversion module converts the initial data into first data; and after the frame rate strategy control module generates the decision instruction based on the target frame rate strategy, the method further includes:
the second conversion module converts the decision instruction into second data; and
the interface matching module outputs the second data.

In the foregoing manner, the frame rate strategy decision layer is disposed as an independent module, and data is converted by using a conversion interface, so that this method is applicable to different chip architectures, and subsequent expansion and maintenance of a function such as matching logic of the photographing frame rate are further facilitated.

In a possible implementation of the first aspect, the sensing data includes at least one of an ambient brightness value, a dynamic range value, status information, or a scene type, and the control data includes a zoom ratio; and
that the frame rate strategy decision layer determines the target frame rate strategy based on the initial data includes:
the frame rate strategy calculation module calculates matched condition information based on the ambient brightness value and the control data;
the frame rate strategy calculation module matches the condition information with the parsed frame rate strategy and calculates a frame rate result; and
the frame rate strategy calculation module determines the target frame rate strategy based on the frame rate result and the sensing data.

In a possible implementation of the first aspect, the condition information includes at least one of an ultra-wide angle mode, a night view mode, a daylight mode, or a telephoto mode, and the method further includes:
if the condition information is the ultra-wide angle mode, the night view mode, or the telephoto mode, the frame rate result calculated by the frame rate strategy calculation module is a first frame rate; and
if the condition information is the daylight mode, the frame rate result calculated by the frame rate strategy calculation module is a second frame rate.

In a possible implementation of the first aspect, the method further includes:
when the calculated condition information is switched from the ultra-wide angle mode, the night view mode, or the telephoto mode to the daylight mode, the target frame rate strategy is switched from a frame rate strategy corresponding to the first frame rate to a frame rate strategy corresponding to the second frame rate.

In the foregoing manner, the frame rate strategy decision layer is disposed, so that photographing frame rates that match different photographing scenes can be dynamically controlled based on various types of data in the initial data. Therefore, power consumption that may be generated when a photographing scene has a relatively high requirement and the device performs photographing by using a fixed frame rate can be reduced, power consumption between the photographing scene, the photographing frame rate, and running of the device is balanced, and service time of the device is prolonged.

In a possible implementation of the first aspect, that the frame rate strategy decision layer determines the target frame rate strategy based on the initial data includes:
if the ambient brightness value is greater than a brightness threshold, the dynamic range value is greater than a dynamic threshold, and the status information is a jitter state, using a first strategy in the plurality of frame rate strategies as the target frame rate strategy;

if the ambient brightness value is greater than the brightness threshold, the dynamic range value is greater than the dynamic threshold, the status information is a still state, and the scene type is a light blinking scene, using a second strategy in the plurality of frame rate strategies as the target frame rate strategy; or
if the ambient brightness value is greater than the brightness threshold, the dynamic range value is greater than the dynamic threshold, the status information is a still state, and the scene type is a light invariant scene, using the first strategy in the plurality of frame rate strategies as the target frame rate strategy.

In a possible implementation of the first aspect, that the frame rate strategy decision layer determines the target frame rate strategy based on the initial data includes:
if the ambient brightness value is greater than a brightness threshold, the dynamic range value is less than or equal to a dynamic threshold, and the status information is a jitter state, using a third strategy in the plurality of frame rate strategies as the target frame rate strategy;
if the ambient brightness value is greater than the brightness threshold, the dynamic range value is less than or equal to the dynamic threshold, the status information is a still state, and the scene type is a light blinking scene, using a second strategy in the plurality of frame rate strategies as the target frame rate strategy; or
if the ambient brightness value is greater than the brightness threshold, the dynamic range value is less than or equal to the dynamic threshold, the status information is a still state, and the scene type is a light invariant scene, using a third strategy in the plurality of frame rate strategies as the target frame rate strategy.

In a possible implementation of the first aspect, that the frame rate strategy decision layer determines the target frame rate strategy based on the initial data includes:
if the ambient brightness value is less than or equal to a brightness threshold, using a third strategy in the plurality of frame rate strategies as the target strategy.

In a first possible implementation of the first aspect, the initial data further includes power consumption information; and
that the frame rate strategy decision layer determines the target frame rate strategy based on the initial data includes:
the frame rate strategy decision layer determines the target frame rate strategy based on the sensing data, the control data, and the power consumption information.

In the foregoing manner, based on a multi-camera architecture of the device, a dynamic frame rate control function is expanded. When a video recording condition (such as camera switching, zoom ratio switching, ambient brightness changing, or photographing algorithms with different power consumption) dynamically changes with a scene, a function of flexibly switching the photographing frame rate as a condition changes in a video recording process can be provided, thereby achieving better balance between a photographing effect and power consumption of the device.

According to a second aspect, an electronic device is provided. The electronic device includes a memory and a processor. The memory stores a computer program capable of running on the processor, and when the processor executes the computer program, the photographing frame rate control method provided in the first aspect or any possible implementation of the first aspect is implemented.

According to a third aspect, a chip system is provided, and includes a processor, configured to invoke a computer program from a memory and run the computer program, so that a device on which a chip is mounted performs the photographing frame rate control method provided in the first aspect or any possible implementation of the first aspect.

According to a fourth aspect, a computer-readable storage medium is provided, and stores a computer program. When the computer program is executed by a processor, the photographing frame rate control method provided in the first aspect or any possible implementation of the first aspect is implemented.

According to a fifth aspect, a computer program product is provided. When the computer program product runs on an electronic device, the electronic device is enabled to perform the photographing frame rate control method provided in the first aspect or any possible implementation of the first aspect.

It may be understood that for beneficial effects of the second aspect to the fifth aspect, refer to the related descriptions in the first aspect. Details are not described herein again.

BRIEF DESCRIPTION OF DRAWINGS

FIG. 9 is a schematic diagram of frame rate strategy matching in an application scenario according to an embodiment of this application;

FIG. 10 is a schematic diagram of an application scenario according to an embodiment of this application;

DESCRIPTION OF EMBODIMENTS

Figure 1A:
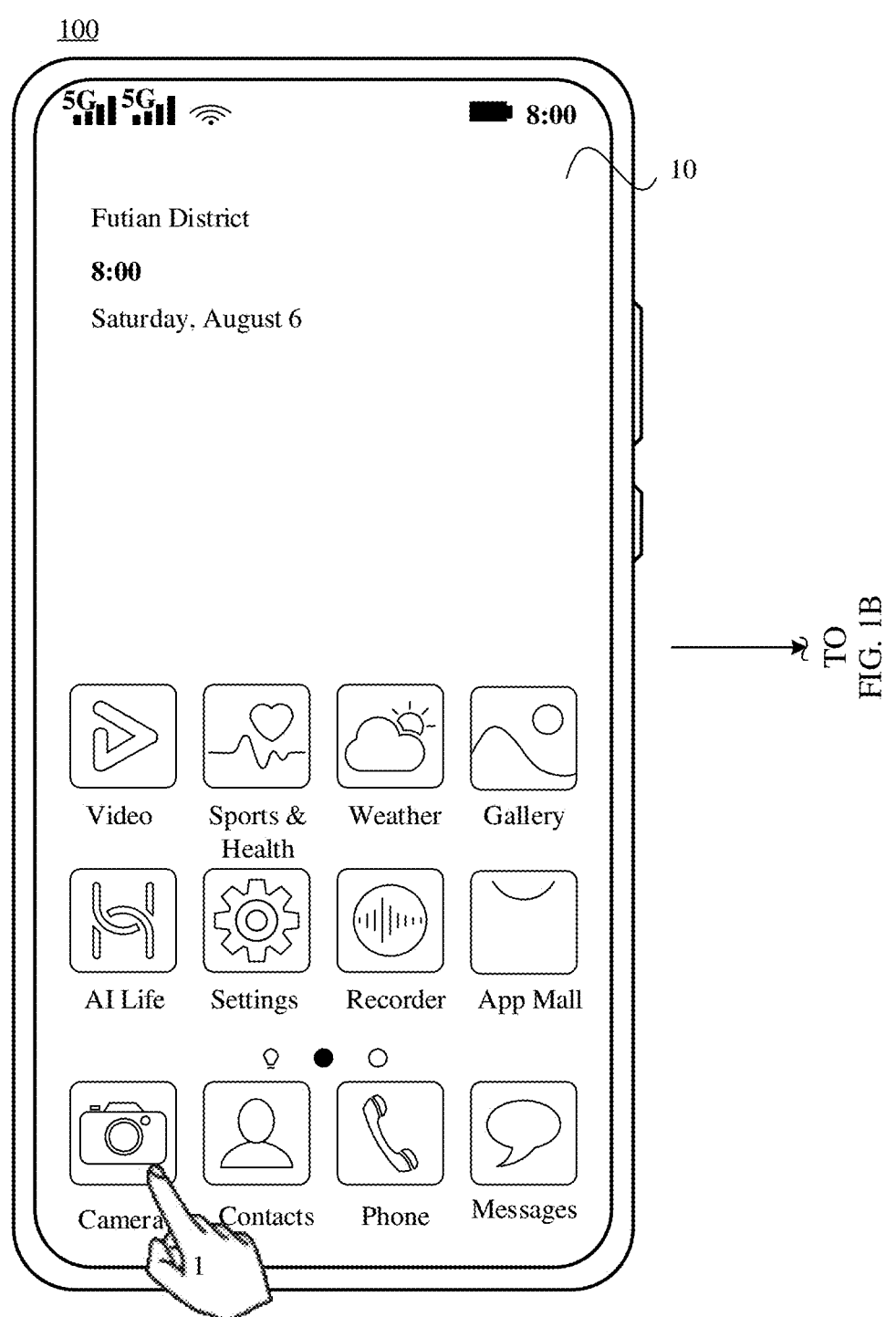
FIG. 1A and FIG. 1B are a schematic diagram of a scenario to which a photographing frame rate control method is applicable according to an embodiment of this application.

In the following descriptions, for the purpose of description instead of limitation, specific details such as a specific system structure and a technology are proposed, to provide a thorough understanding of embodiments of this application. However, a person skilled in the art should understand that this application may also be implemented in another embodiment without these specific details. In other cases, detailed descriptions about a well-known system, apparatus, circuit, and method are omitted to prevent unnecessary details from obscuring the description of this application.

To describe the technical solutions described in this application, the following describes the technical solutions by using specific embodiments.

It should be understood that when being used in this specification and the appended claims, the term "include" indicates presence of a described feature, entirety, step, operation, element, and/or component, but does not exclude presence or addition of one or more other features, entireties, steps, operations, elements, components, and/or sets thereof.

It should be further understood that the terms used in the specification of this application are for the purpose of describing specific embodiments only, and not for limiting this application. As used in this specification and the appended claims of this application, unless the context clearly indicates other cases, the singular forms "a", "one" and "this" are intended to include a plural form.

It should be further understood that the term "and/or" used in this specification and the appended claims of this application means any combination and all possible combinations of one or more of listed associated items, and these combinations are included.

As used in this specification and the appended claims, the term "if" may be interpreted according to the context as "when . . . ", "once", "in response to determining", or "in response to detecting". Similarly, the phrase "if it is determined that" or "if [a described condition or event] is detected" may be interpreted according to the context as "once it is determined that", "in response to determining that", "once [a described condition or event] is detected", or "in response to detecting [a described condition or event]".

First, some terms in the embodiments of this application are explained and described for ease of understanding by a person skilled in the art.

1. A frame rate (Frame rate) is a frequency (rate) at which a bitmap image in units of frames continuously appears on a display, and is usually represented by fps (Frames Per Second). The frame rate may reflect, to some extent, smoothness of a captured video page. A photographing frame rate is a quantity of refreshing times per second of a hardware sensor that can be called by an electronic device based on a current photographing environment, and may also be referred to as a recording frame rate or a real-time frame rate.

2. Focal length: A value of a focal length indicates magnitude of refractive power, and a smaller focal length indicates greater refractive power. A focal length of an optical lens assembly determines a size of an image generated on an imaging plane for a photographed object that is photographed by the optical lens assembly. Assuming that a same photographed object is photographed at a same distance, a larger focal length of the optical lens assembly indicates a larger magnification factor of an image generated by the photographed object on a charge-coupled device (charge-coupled device, CCD).

3. Optical zooming is mainly a contrast ratio and switching of different focal lengths in a camera module. An optical zoom ratio may be used to indicate an optical zooming capability. A larger optical zoom ratio indicates a farther scene that can be photographed. A value of the optical zoom ratio is related to a physical focal length of the optical lens assembly. Usually, an equivalent focal length 28 mm of the camera module corresponds to an optical zoom ratio of 1× (namely, 1 time).

4. Field of view (field of view, FOV): The field of view is used to indicate a maximum angle range in which a camera can perform photographing. If a to-be-photographed object falls within this angle range, the to-be-photographed object can be captured by the camera. If the to-be-photographed object is beyond this angle range, the to-be-photographed object is not captured by the camera.

Generally, a larger field of view of the camera indicates a larger photographing range and a shorter focal length, and a smaller field of view of the camera indicates a smaller photographing range and a longer focal length. Therefore, cameras may be classified into a main camera, a wide-angle camera, and a telephoto camera due to different fields of view. The wide-angle camera has a larger field of view and a shorter focal length than the main camera and is suitable for close-range photographing. However, the telephoto camera has a smaller field of view and a longer focal length than the main camera and is suitable for long-range photographing.

5. Lighting value (lighting value, LV): The lighting value is used to estimate ambient brightness, and a specific calculation formula of the lighting value is as follows:

$$LV = 10 \times \log_2\left(\frac{\text{Aperture}^2}{\text{Exposure}} \times \frac{100}{ISO} \times \frac{\text{Luma}}{46}\right)$$

Exposure is exposure time, Aperture is an aperture size, ISO is photosensibility, and Luma is an average value of Y in XYZ color space.

6. Dynamic range (dynamic range) value: The dynamic range value is used to represent information about a proportion of an overexposed area in an entire preview image obtained by a camera.

The foregoing is a brief description of the terms used in the embodiments of this application, and details are not described again below.

Generally, when a photographing environment is in good condition, an electronic device (for example, a mobile phone) performs video recording by using a relatively high photographing frame rate, to achieve a better video recording effect. However, photographing at the relatively high frame rate leads to an increase in power consumption. When power consumption needs to be limited in some scenarios, relatively low photographing power needs to be used.

Currently, during video recording, a user can only manually select a specific frame rate mode in several frame rates supported by hardware of a device, for example, 30 frames or 60 frames, which has poor applicability to different photographing environments, and may generate more unnecessary power consumption, and consequently, service time of the device is shortened. In addition, a service related to a plurality of cameras is associated with and coupled to a hardware platform of an electronic device, and this is not conducive to subsequent development and maintenance of functions.

For the foregoing disadvantages, embodiments of this application provide a photographing frame rate control method. Frame rate matching and scheduling for a plurality of cameras are integrated into one module, so that control over photographing frame rates of the plurality of cameras is decoupled from a hardware platform, and is not limited by the hardware platform but is applicable to platforms of different chip architectures. In addition, control over the photographing frame rate can be more flexible, and dynamic switching may be performed based on different photographing environments. This is more friendly and convenient for subsequent expansion and maintenance of functions applicable to a more complex scenario.

The photographing frame rate control method provided in the embodiments of this application may be applied to the photographing field. For example, the photographing frame rate control method may be used in a video recording process.

A scenario to which the photographing frame rate control method provided in the embodiments of this application is applicable is described below. In an example, an example in which an electronic device 100 is a mobile phone is used for description.

The mobile phone may include a plurality of cameras. For example, the mobile phone has four rear-facing cameras and one front-facing camera. The four rear-facing cameras may be respectively a wide-angle camera, a main camera, a black and white camera, and a telephoto camera. The four rear-facing cameras are used to photograph a same to-be-photographed scene. The front-facing camera is a camera that is on a same plane as a display screen, and may be used for video recording, multi-lens video recording, face recognition, and the like.

Certainly, the electronic device 100 may also include another camera. Types of cameras and a quantity of each type of camera may be set as required. This is not limited in this embodiment of this application. For example, the four cameras included by the electronic device 100 may be alternatively an ultra-wide-angle camera, a wide-angle camera, a black and white camera, and a telephoto camera, respectively.

It should be understood that different cameras correspondingly support different zoom ratios, and the electronic device may receive tapping or dragging performed by a user on a zoom ratio control to adjust a current focal length used to perform photographing by using a plurality of cameras. Generally, a zoom ratio range of the main camera and a zoom ratio range of the black and white camera are basically the same, whereas a zoom ratio corresponding to the wide-angle camera is smaller than a zoom ratio of the main camera, and a zoom ratio of the telephoto camera is larger than a zoom ratio of the main camera. The zoom ratio means an optical zooming capability of a camera.

For example, a zoom ratio range corresponding to the wide-angle camera is [0.1, 1), the zoom ratio range corresponding to the main camera is [1, 3.9), the zoom ratio range corresponding to the black and white camera is [1, 2), and a zoom ratio range corresponding to the telephoto camera is [3.9, 100). 0.1 means 0.1 times the zoom ratio, that is, 0.1×. 1 means 1 times the zoom ratio, that is, 1×. 2 means 2 times the zoom ratio, that is, 2×. 3.9 means 3.9 times the zoom ratio, that is, 3.9×. 100 means 100 times the zoom ratio, that is, 100×.

Scenario 1

Figure 1B:
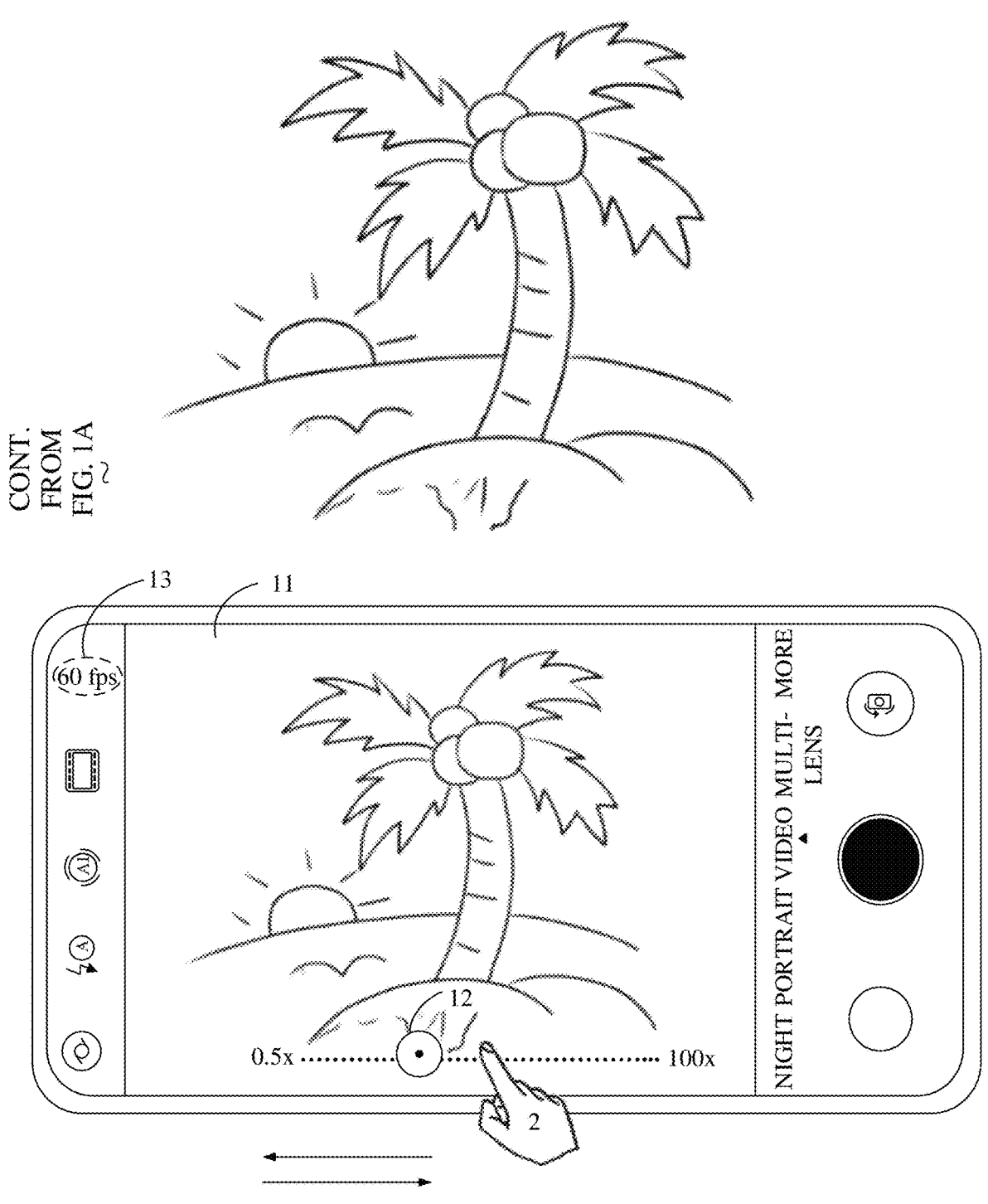

Reference is made to FIG. 1A and FIG. 1B. FIG. 1A and FIG. 1B are a schematic diagram of a scenario to which a photographing frame rate control method is applicable according to an embodiment of this application.

As shown in FIG. 1A and FIG. 1B, an electronic device detects a first operation on a first control in a display interface. The display interface may be a home screen 10; the first control may be a camera control on the home screen; and the first operation may be an operation of tapping the camera control by a user, for example, an operation 1.

Correspondingly, the display interface may be alternatively a preview interface 11, that is, an interface displayed after a camera application is opened; the first control may be alternatively a zoom control in the preview interface, for example, a zoom bar 12 in FIG. 1B; and the first operation may be alternatively an operation of tapping or sliding the zoom bar by the user, for example, an operation 2, to change a zoom ratio of a camera function before performing recording or in a recording process.

In response to the operation (such as the operation 1) of tapping the camera control on the home screen 10 by the user, a mobile phone may start the camera application, and display a graphical user interface (graphical user interface, GUI) shown in FIG. 1A and FIG. 1B. The GUI interface may be referred to as the preview interface 11. The preview interface includes a viewfinder window, a plurality of photographing mode options, and the zoom bar 12. The viewfinder window may be used to display a preview image in real time. The photographing modes include a night view mode, a portrait mode, a video recording mode, a multi-lens video recording mode, and the like. In the video recording mode, the preview interface may further include a frame rate control 13 used to display a photographing frame rate applicable to a current photographing scene.

For example, the photographing frame rate correspondingly displayed by the frame rate control 13 may be dynamically changed based on a change in a photographing environment or the first operation (such as the operation 2) of the user. Correspondingly, the user may further change a photographing focal length segment of the camera function by tapping the zoom bar 12 in the preview interface 11. The user may select, from the zoom bar 12, a zoom ratio required by a current recording scenario, for example, a zoom ratio of 0.5 times, 2 times, or 50 times.

For example, the user may increase the zoom ratio by using a sliding operation, to continuously magnify a photographed object in the viewfinder window; and the user may reduce the zoom ratio by using the sliding operation, to continuously reduce the photographed object in the viewfinder window. In this way, the user may adjust, by choosing the zoom ratio, the preview image displayed in the viewfinder window.

It should be noted that the photographing frame rate control method provided in this embodiment of this application is applicable to frame rate strategy control performed before photographing starts after the camera application is opened. In this case, matching and adjustment and control of the photographing frame rate may be performed based on information such as a photographing scene or a zoom ratio entered by the user. The frame rate control 13 may be alternatively in an undisplayed state; in other words, a process of controlling a photographing frame rate is in a user-unaware state. Alternatively, a photographing frame rate of an image sensor of the camera function may be directly controlled in the background. FIG. 1A and FIG. 1B are merely for ease of schematic descriptions of a process of dynamically controlling the photographing frame rate in this application. After the camera application is enabled, a program corresponding to the photographing frame rate control method provided in this embodiment of this application can be used when a photographing environment changes before video recording is started or in a video recording process, to achieve better balance between a photographing effect and power consumption in various application scenarios.

Scenario 2

Figure 2A:
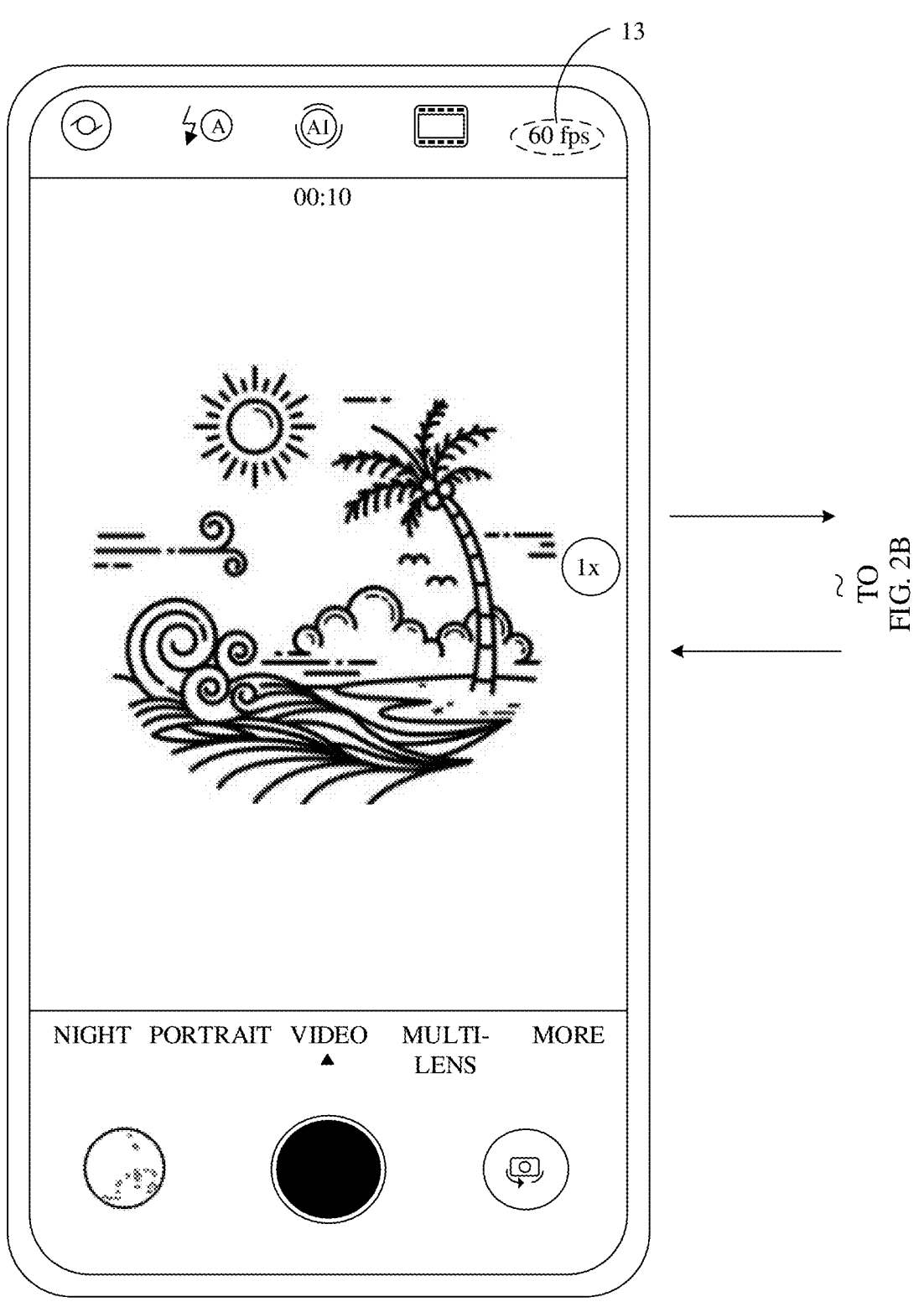
FIG. 2A and FIG. 2B are a schematic diagram of another scenario to which a photographing frame rate control method is applicable according to an embodiment of this application.
Figure 2B:
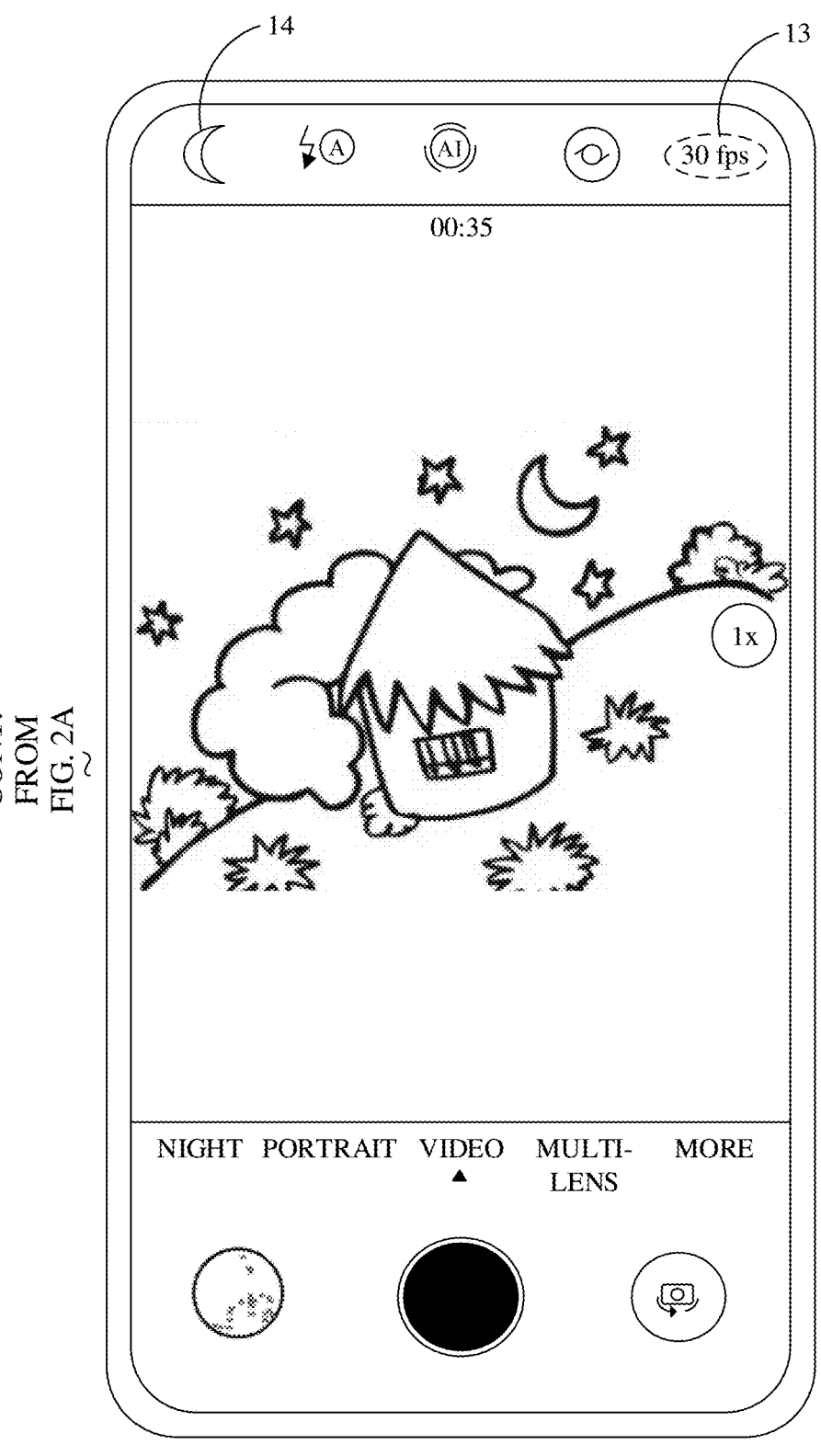

Reference is made to FIG. 2A and FIG. 2B. FIG. 2A and FIG. 2B are a schematic diagram of another scenario to which a photographing frame rate control method is applicable according to an embodiment of this application.

For example, as shown in FIG. 2A and FIG. 2B, when a user wants to take photos of outdoor grass and trees, the user opens a camera application, a default zoom ratio of a preview interface is 1 time, and a camera called by a mobile phone may be a main camera. In a video recording process, when the mobile phone switches from a brighter photographing scene (as shown in FIG. 2A) to a darker photographing scene (as shown in FIG. 2B), based on the photographing frame rate control method provided in this embodiment of this application, a corresponding frame rate is also dynamically adjusted, for example, switched from original 60 fps to 30 fps. Because some image algorithms (for example, a night mode algorithm) appropriate for a corresponding darker application scenario are also relatively complex, power consumption of the mobile phone increases relatively. If collection is still performed at a high frame rate, running of the mobile phone may be affected or endurance duration may be shortened. Therefore, a photographing frame rate is reduced, so that running power consumption in the scenario is balanced while a corresponding photographing effect is ensured.

Correspondingly, when the darker photographing scene is converted into the brighter photographing scene, a corresponding photographing frame rate is also switched back from 30 fps to 60 fps.

For example, when the camera function is in a night view mode, a night view control 14 may be further displayed, to indicate that the camera function is currently in a night view photographing mode.

It should be noted that the photographing frame rate control method provided in this embodiment of this application is further applicable to dynamic matching and adjustment and control of the photographing frame rate when a photographing scene changes or a zoom ratio entered by the user changes in a photographing process after the camera application is opened. The photographing frame rate in the foregoing application scenario is merely a schematic description, and may be alternatively another frame rate, such as 24 frames or 72 frames, or may be another control parameter related to an image output format. This is not specifically limited herein. In addition, for an application scenario in which a photographing scene is switched, control over a photographing frame rate corresponding to the photographing scene may further support continuous conversion between two frame rates. For example, the frame rate may be continuously switched from 30 fps corresponding to a first photographing scene to 31 fps, 32 fps, or 33 fps. A specific spanning value of each time of switching corresponding to the photographing frame rate is not limited.

It should be understood that, the foregoing is an example of the application scenario, and does not limit the application scenario of this application or an adjustment direction for the photographing frame rate.

For ease of understanding of the photographing frame rate control method provided in the embodiments of this application, a software system of an electronic device 100 is first described below. The software system of the electronic device 100 may use a layered architecture, an event-driven architecture, a microkernel architecture, a microservice architecture, or a cloud architecture.

It should be noted that, in the embodiments of this application, an operating system (operating system, OS) of the electronic device may include, but is not limited to, operating systems such as Symbian® (Symbian), Android®

(Android), Windows®, iOS® (iOS), Blackberry® (Blackberry), and HarmonyOS (HarmonyOS). This is not limited in this application.

Figure 3:
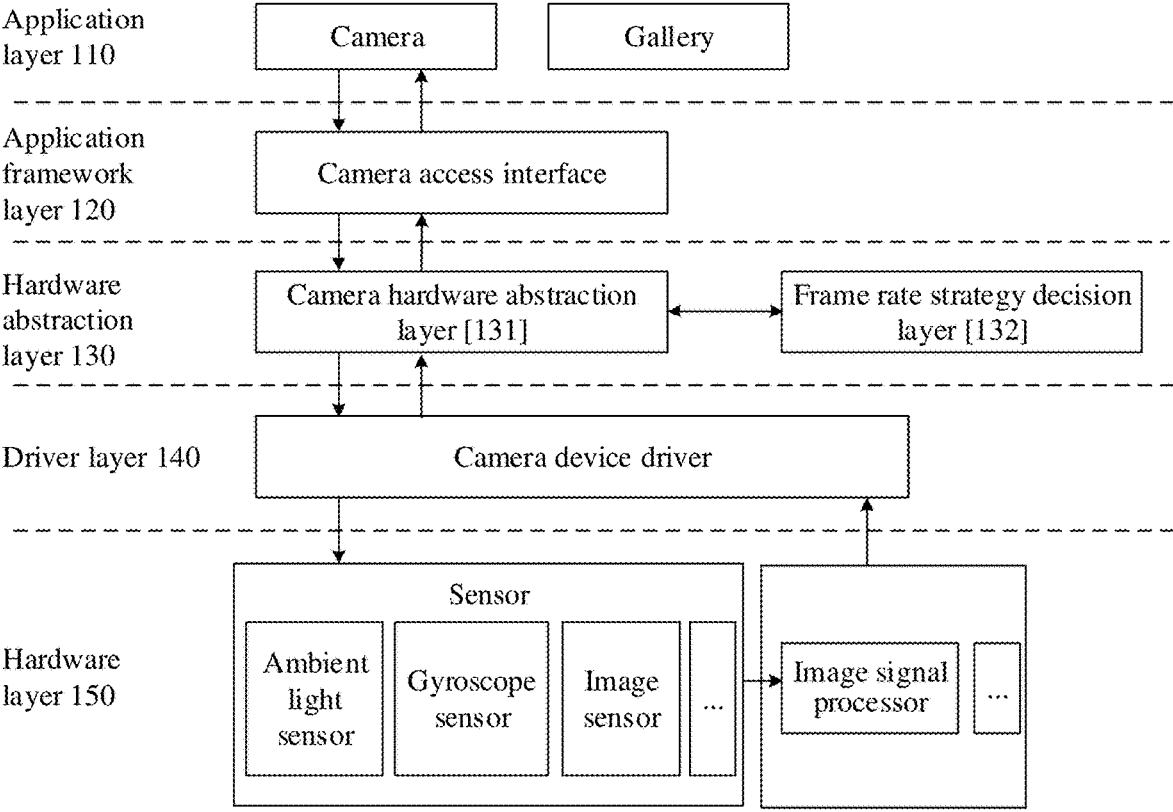
FIG. 3 is a schematic diagram of a structure of a software system of an electronic device according to an embodiment of this application.

In the embodiments of this application, an Android system with a layered architecture is used as an example to describe the software structure of the electronic device 100. FIG. 3 is a block diagram of the software structure of the electronic device 100 according to an embodiment of this application.

As shown in FIG. 3, the layered architecture divides software into several layers, and each layer has a clear role and task. The layers communicate with each other through software interfaces.

In some embodiments, the Android system is divided into five layers: an application (application, APP) layer 110, an application framework layer 120, a hardware abstraction layer (hardware abstract layer, HAL) 130, a driver layer 140, and a hardware layer 150 from top to bottom.

As shown in FIG. 3, the application layer 110 may include a series of application packages. For example, the application layer 110 may include applications such as Camera and Gallery.

The application layer 110 is at the top of the whole framework and bears a responsibility of directly interacting with a user. Once a direct or indirect requirement of the user such as taking photos or recording videos is received, the application layer 110 sends the requirement to the application framework layer 120 through an interface, and waits for the application framework layer 120 to return a processing result. The result includes image data, a camera parameter (such as a photographing frame rate), and the like. Then, the application layer 110 feeds back the result to the user.

The application framework layer 120 is located between the application layer 110 and the hardware abstraction layer 130. The application framework layer 120 provides an application programming interface (application programming interface, API) and a programming framework for applications at the application layer 110. The application framework layer 120 includes some predefined functions.

The application framework layer 120 is a framework of an application. Developers can develop some applications based on the application framework layer 120 while following development principles of the application framework. In addition, the application framework layer 120 also includes an access interface corresponding to a camera application, and the like.

The hardware abstraction layer 130 is configured to perform hardware abstraction, to provide a virtual hardware use platform for an operating system. Specifically, with reference to the solutions of this application, for example, the hardware abstraction layer 130 may include a camera hardware abstraction layer 131 and the like.

The driver layer 140 is configured to provide driving for different hardware devices. For example, the driver layer 140 may include a camera device driver.

The hardware layer 150 may include a sensor (sensor), an image signal processor, and another hardware device. This is not limited in this application. The sensor may further include an ambient light sensor, a gyroscope sensor, an image sensor, and the like.

In this application, a connection between the application layer 110 and the application framework layer 120 above the hardware abstraction layer 130 and the driver layer 140 and the hardware layer 150 below the hardware abstraction layer 130 may be implemented by calling the camera hardware abstraction layer 131 in the hardware abstraction layer 130, to implement camera data transmission and function control.

Based on this, in this embodiment of this application, a frame rate strategy decision layer 132 is added to the hardware abstraction layer 130. The frame rate strategy decision layer 132 is connected to the camera hardware abstraction layer 131, so that photographing frame rate strategies of different photographing environments may be matched at the frame rate strategy decision layer 132, and different matching logic of frame rate control is customized based on different requirements or actual scenario applications. The frame rate strategy decision layer 132 may obtain various parameters by using the camera hardware abstraction layer 131, and call various hardware such as a sensor and an ISP to implement dynamic adjustment of a photographing frame rate for different photographing environments in a photographing process.

Figure 4:
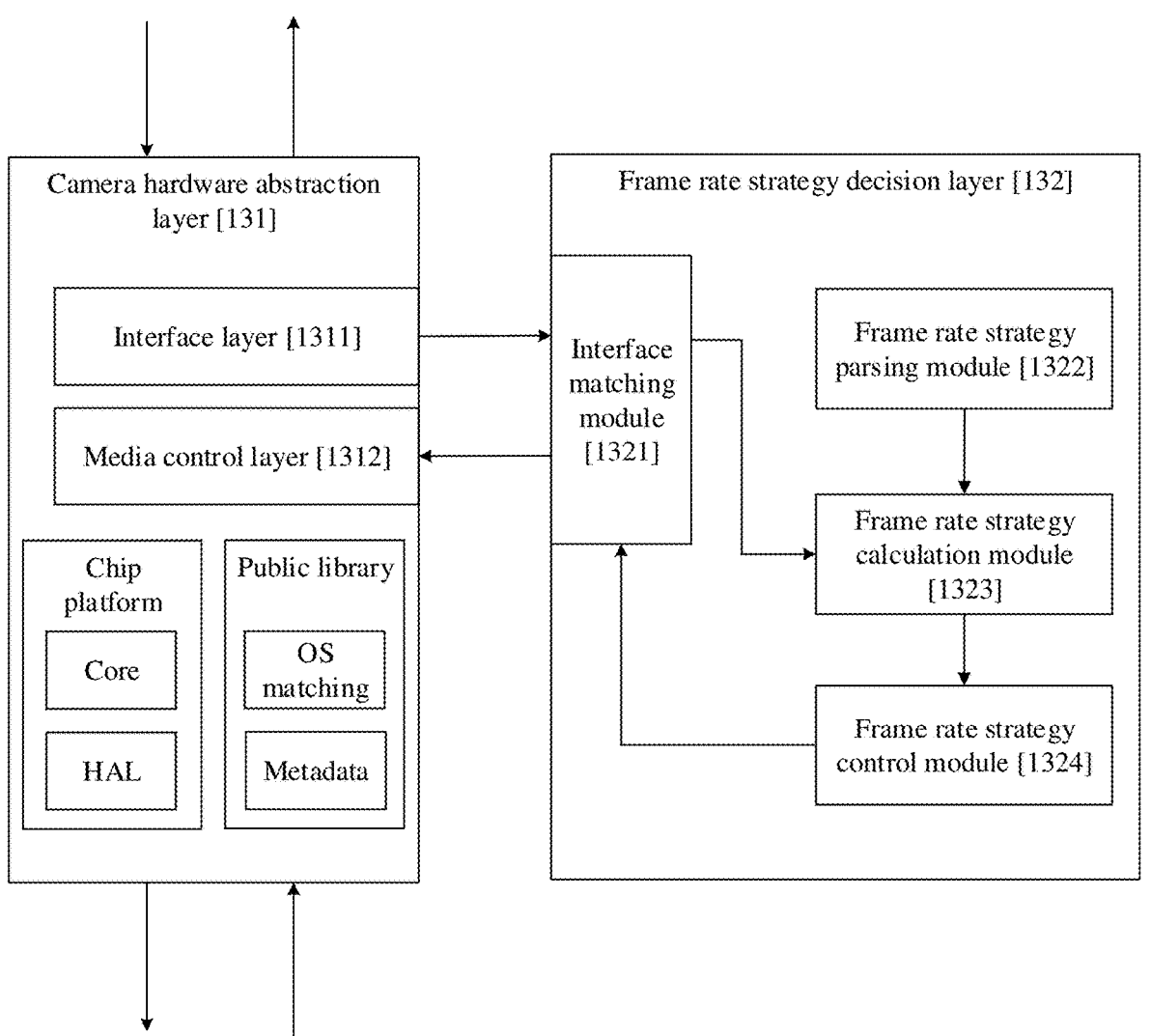
FIG. 4 is a schematic diagram of a structure of a hardware abstraction layer according to an embodiment of this application.
Figure 5:
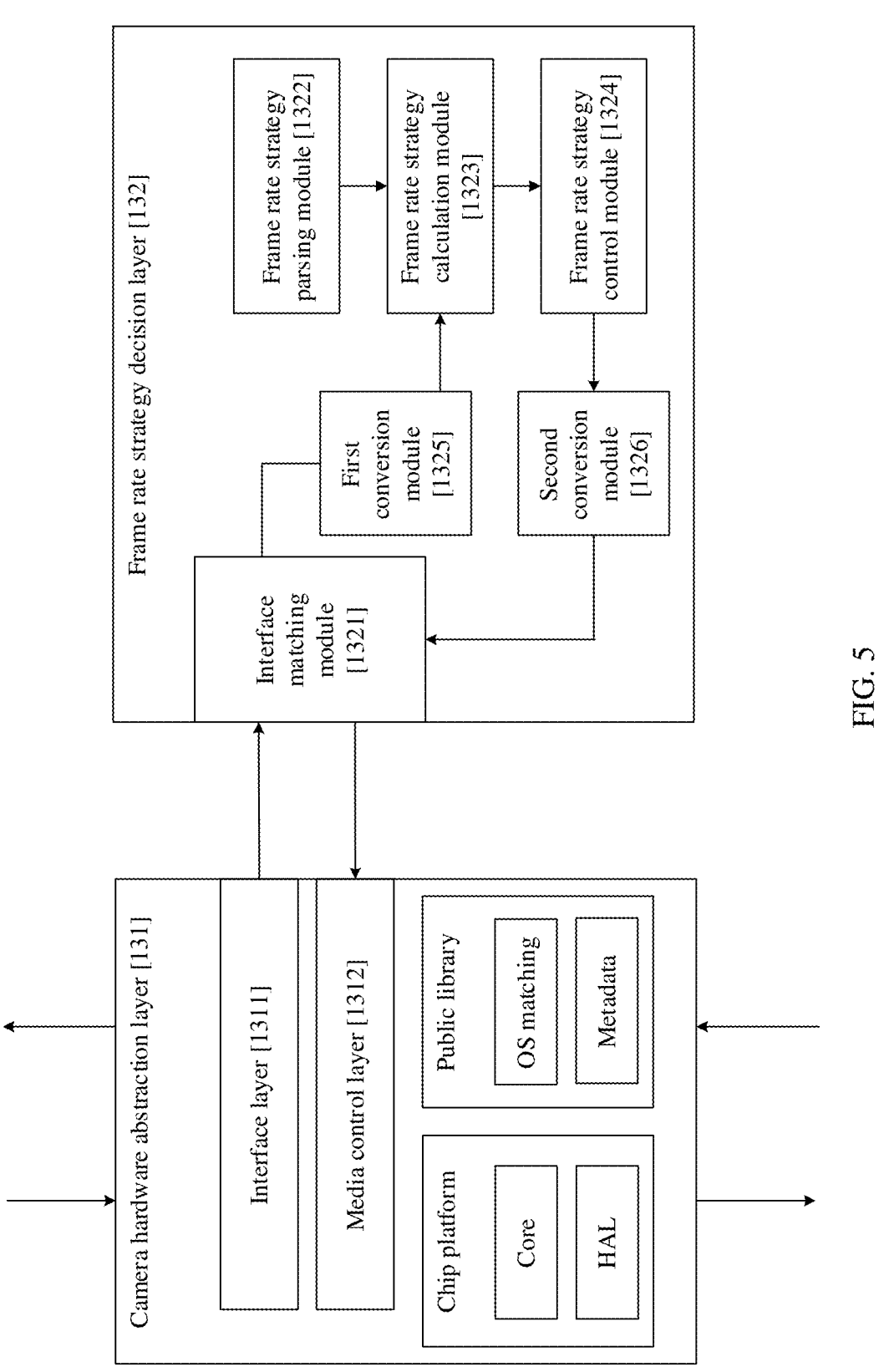
FIG. 5 is a schematic diagram of a structure of another hardware abstraction layer according to an embodiment of this application.

Reference is made to FIG. 4 and FIG. 5. FIG. 4 is a schematic diagram of a structure of a hardware abstraction layer 130 according to an embodiment of this application. FIG. 5 is a schematic diagram of a structure of another hardware abstraction layer 130 according to an embodiment of this application.

As shown in FIG. 4 and FIG. 5, in some embodiments, a camera hardware abstraction layer 131 includes an interface layer 1311 with general functionality. The interface layer 1311 is configured to access different operating systems to implement management and control.

The camera hardware abstraction layer 131 further includes a media control layer 1312, a chip platform (Camx), and a public library. The media control layer 1312 is used for service customization of the chip platform. The chip platform includes a set of code of an interface with general functionality, and the like. For example, core is configured to store a core implementation module of the chip platform. The public library includes various data such as matching data of the operating system and metadata (Metadata).

As shown in FIG. 4, the frame rate strategy decision layer 132 includes a frame rate strategy parsing module 1322, a frame rate strategy calculation module 1323, and a frame rate strategy control module 1324 that are connected in sequence. The frame rate strategy decision layer 132 further includes an interface matching module 1321.

The interface matching module 1321 is further separately connected to the frame rate strategy calculation module 1323, the frame rate strategy control module 1324, and the camera hardware abstraction layer 131. The interface matching module 1321 is configured to: receive initial data from the camera hardware abstraction layer 131, and provide the initial data for the frame rate strategy calculation module 1323. The interface matching module 1321 is further configured to: receive a decision instruction provided by the frame rate strategy control module 1324, and provide the decision instruction for the camera hardware abstraction layer 131, so that the camera hardware abstraction layer 131 can perform control according to the decision instruction.

Optionally, the interface matching module 1321 is separately connected to the interface layer 1311 and the media control layer 1312 in the camera hardware abstraction layer 131. The interface matching module 1321 is configured to: receive the initial data from the interface layer 1311, and provide the initial data for the frame rate strategy calculation module 1323. The interface matching module 1321 is further configured to: receive the decision instruction provided by the frame rate strategy control module 1324, and provide the decision instruction for the media control layer 1312, so that the media control layer 1312 can perform control according to the decision instruction.

The frame rate strategy parsing module 1322 is configured to parse a frame rate strategy configuration to obtain a plurality of frame rate strategies.

The frame rate strategy calculation module 1323 is configured to determine, from the plurality of frame rate strategies based on the initial data, a target frame rate strategy that matches the initial data, where the target frame rate strategy is one of the plurality of frame rate strategies.

The frame rate strategy control module 1324 is configured to generate the decision instruction based on the target frame rate strategy.

The interface matching module 1321 is configured to output the decision instruction.

In some embodiments, the initial data may include at least one of sensing data or control data.

The sensing data may include at least one of an ambient brightness value, a dynamic range value, status information, or a scene type, and the control data may include a zoom ratio and the like. The sensing data may be specifically set as required, and is not limited in this embodiment of this application. The control data may be an instruction generated by a user by tapping or dragging a corresponding zoom ratio control. The sensing data in the initial data is used to indicate a type of a current photographing environment of the electronic device, and the control data in the initial data is used to indicate a zoom ratio that can be selected when the user performs video recording.

It should be understood that the zoom ratio includes a corresponding zoom ratio used before the user performs a zooming operation, which is referred to as a first zoom ratio herein, and a zoom ratio used after the user performs the zooming operation, which is referred to as a second zoom ratio herein.

A zoom switching manner means an operation manner used when the user changes the zoom ratio, such as a sliding manner or a tap-to-switch manner. The sliding manner means that the user continuously slides at a position of a zoom bar or a display screen to change the zoom ratio. The tap-to-switch manner means that the user directly taps a zoom ratio value at a position on an interface to change the zoom ratio. The tap-to-switch manner is characterized by discontinuity, which is opposite to a characteristic of the sliding manner.

The ambient brightness value is a lighting value collected by an ambient light sensor. Based on setting of a brightness threshold, a reference indicator of the ambient brightness value may include dark dark (or low brightness), ordinary brightness ordinary, and bright bright (or high brightness). Different reference indicators correspond to different brightness ranges.

The dynamic range value is set based on a dynamic threshold, and a reference indicator of the dynamic range value may include high dynamic and low dynamic.

The status information is a state of the electronic device in the video recording process, and may be measured by a gyroscope sensor at a hardware layer. A reference indicator of the status information may include a jitter scene and a still scene.

The scene type is an indicator determined based on blinking of light in an environment. A reference indicator of the scene type may include light blinking (or light blinks at a high frequency) and light-invariant, and may be measured by using the ambient light sensor by using a collected light blinking situation.

Data such as the zoom ratio may be from an application layer 110. The sensing data may be from a chip platform, the hardware abstraction layer 130, or the hardware layer 150, or the like, or certainly may be from another layer. This is not limited in this embodiment of this application.

It should be noted that the dynamic frame rate configuration may include a plurality of frame rate strategies as required, for example, may include a first strategy, a second strategy, and a third strategy. The corresponding zoom ratio may be alternatively another range, and is not specifically limited.

FIG. 9 shows frame rate strategies corresponding to photographing scenes when a range of the zoom ratio is [1.0, 4.0). For example, the first strategy may be a high-quality low-frame strategy. When the ambient brightness value is greater than a brightness threshold, the dynamic range value is greater than a dynamic threshold, and the status information is a jitter state, the first strategy in a plurality of rate strategies is used as the target frame rate strategy, and a decision instruction corresponding to the first strategy is output, to control a photographing frame rate in the video recording process. Therefore, a photographing scene with high brightness, high dynamic, and the jitter state is matched, for example, photographing of a concert site shown in (b) in FIG. 10. When the ambient brightness value is greater than the brightness threshold, the dynamic range value is greater than the dynamic threshold, the status information is a still state, and the scene type is a light invariant scene, the first strategy in the plurality of frame rate strategies is used as the target frame rate strategy, and the decision instruction corresponding to the first strategy is output, to control the photographing frame rate in the video recording process. Therefore, a photographing scene with high brightness, high dynamic, the still state, and invariant light is matched.

For example, the second strategy may be a low-quality high-frame strategy. When the ambient brightness value is greater than a brightness threshold, the dynamic range value is greater than a dynamic threshold, the status information is a still state, and the scene type is a light blinking scene, the second strategy in the plurality of frame rate strategies is used as the target frame rate strategy, and a decision instruction corresponding to the second strategy is output, to control a photographing frame rate in the video recording process. Therefore, a photographing scene with high brightness, high dynamic, the still state, and frequent light blinking is matched, for example, photographing of a scene in which marquees are disposed as shown in (a) in FIG. 10. When the ambient brightness value is greater than the brightness threshold, the dynamic range value is less than or equal to the dynamic threshold, the status information is a still state, and the scene type is a light flashing scenario, the second strategy in the plurality of frame rate strategies is used as the target frame rate strategy, and the decision instruction corresponding to the second strategy is output, to control the photographing frame rate in the video recording process. Therefore, a photographing scene with high brightness, low dynamic, the still state, and frequent light blinking is matched.

For example, the third strategy may be a low-quality low-frame strategy. When the ambient brightness value is greater than a brightness threshold, the dynamic range value is less than or equal to a dynamic threshold, and the status information is a jitter state, the third strategy in the plurality of frame rate strategies is used as the target frame rate strategy, and the strategy may be invoked to output a decision instruction corresponding to the third strategy, to control a photographing frame rate in the video recording process. Therefore, a photographing scene with high brightness, low dynamic, and the jitter state can be matched. When the ambient brightness value is greater than the brightness threshold, the dynamic range value is less than or equal to the dynamic threshold, the status information is a still state, and the scene type is a light invariant scene, the third strategy in the plurality of frame rate strategies is used as the target frame rate strategy, to match a scene type with high brightness, low dynamic, the still state, and invariant light. When the ambient brightness value is less than or equal to the brightness threshold, the third strategy in the plurality of frame rate strategies is used as the target strategy, to match a photographing scene with low brightness.

For example, a finally output decision instruction may include a sensing module parameter, for example, a sensing module parameter corresponding to a high-quality low frame rate may be 30 fps of a dual conversion gain control unit (Dual Conversion Gain, DCG). The DCG is an image output format for improving quality of an image output by an image sensor, and high-conversion gain and low-conversion gain reading modes may be used to output a high-dynamic range image. A sensing module parameter corresponding to low-quality high frame may be 60 fps of Binning, and Binning is an image reading mode, and charges induced by adjacent cells are added and read in a mode of one pixel. A sensing module parameter corresponding to corresponding low-quality low frame may be 30 fps of Binning.

The plurality of frame rate strategies in the dynamic strategy configuration may be a file configured in an XML format, and certainly, may be alternatively configured in another manner. This is not limited in the embodiments of this application.

It should be understood that a quantity, content, and a format of the foregoing frame rate strategies may be set and changed as required. This is not limited in the embodiments of this application.

Optionally, as shown in FIG. 5, the frame rate strategy decision layer 132 further includes a first conversion module 1325 and a second conversion module 1326.

The first conversion module 1325 is connected between the interface matching module 1321 and the frame rate strategy calculation module 1323. The first conversion module 1325 is configured to convert the initial data received by the interface matching module 1321 into first data and input the first data into the frame rate strategy calculation module 1323.

The second conversion module 1326 is connected between the frame rate strategy control module 1324 and the interface matching module 1321. The second conversion module is configured to convert the decision instruction output by the frame rate strategy control module 1324 into second data and provide the second data for the interface matching module 1321 for output.

It should be noted that, a format of the first data needs to be a format that can be identified and processed by the frame rate strategy calculation module 1323, such as a McxContext format, and a format of the second data needs to be a format that can be identified and processed by the camera hardware abstraction layer 131. Therefore, different conversion modules may be disposed, to match different chip platforms, so that platform applicability and portability are good.

An embodiment of this application provides an electronic device. A frame rate strategy decision layer integrated with a plurality of frame rate strategies is added to a hardware abstraction layer of the electronic device, so that a photographing frame rate of a camera function can be decoupled from a chip platform, and a frame rate strategy at a frame rate strategy decision layer can be more flexibly configured and changed, to meet photographing requirements of more photographing scenes, and the photographing frame rate better matches power consumption, thereby prolonging service time of the electronic device.

Figure 6:
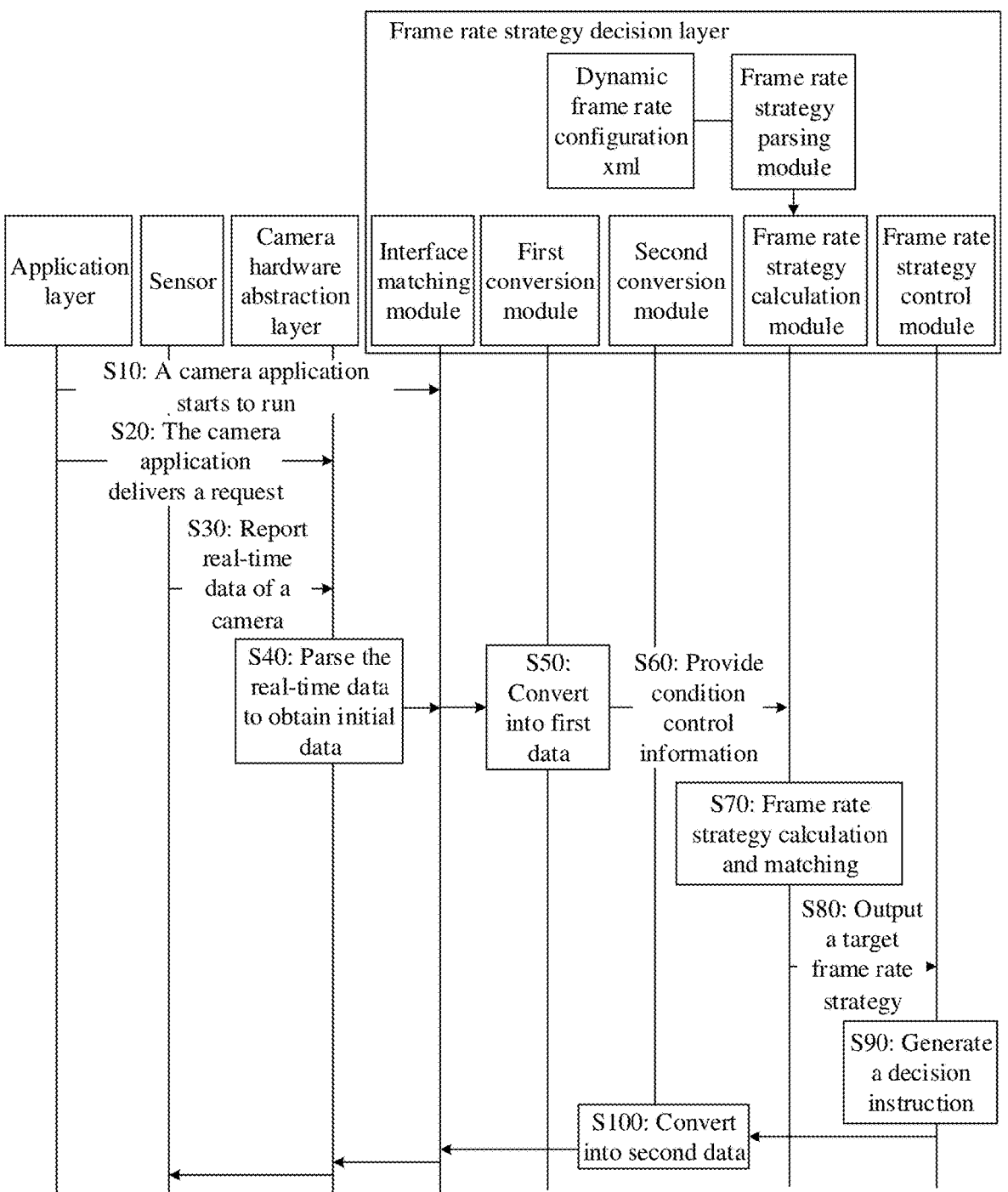
FIG. 6 is a schematic flowchart of a photographing frame rate control method according to an embodiment of this application.

For the foregoing software structure, correspondingly, an embodiment of this application provides a photographing frame rate control method. Reference is made to FIG. 6. FIG. 6 is a schematic flowchart of a photographing frame rate control method according to an embodiment of this application. As shown in FIG. 6, the method includes the following S10 to S100.

S10: When an icon of a camera application is tapped by a user to be triggered, an electronic device 100 starts to run the camera application and calls a frame rate strategy decision layer 132 by using a camera hardware abstraction layer 131.

S20: The camera application delivers a request to the camera hardware abstraction layer 131 in response to a preset triggering condition.

S30: A sensor at a hardware layer 150 reports real-time data of a camera to the camera hardware abstraction layer 131.

For example, the real-time data of the camera may include data corresponding to various photographing scenes.

S40: The camera hardware abstraction layer 131 obtains corresponding initial data through parsing based on the delivered request and the reported real-time data of the camera.

For example, the initial data may include sensing data and control data. The sensing data may include an ambient brightness value, a dynamic range value, status information, a scene type, and the like. The control data may include a zoom ratio.

S50: The camera hardware abstraction layer 131 transmits the initial data to an interface matching module 1321 in the frame rate strategy decision layer 132; the interface matching module 1321 provides the initial data for a first conversion module 1325; and the first conversion module 1325 converts the initial data into first data.

The first data may be condition control information that is obtained after the initial data is converted and that is corresponding to a photographing scene.

S60: After converting the data into the first data, the first conversion module 1325 may provide the condition control information corresponding to the photographing scene for a frame rate strategy calculation module 1323.

S70: The frame rate strategy calculation module 1323 calculates a matched target frame rate strategy in a plurality of frame rate strategies based on the received condition control information.

A frame rate strategy parsing module parses a dynamic frame rate configuration to obtain the plurality of frame rate strategies, and the target frame rate strategy is one of the plurality of frame rate strategies.

S80: The frame rate strategy calculation module 1323 outputs the target frame rate strategy.

The target frame rate strategy is a frame rate strategy that matches different photographing scenes.

S90: A frame rate strategy control module 1324 generates a decision instruction based on the target frame rate strategy, and returns the decision instruction to a second conversion module 1326.

The decision instruction includes a sensor module parameter, and a photographing frame rate of a camera function is controlled by using the sensor module parameter.

S100: The second conversion module 1326 converts the decision instruction into second data, outputs the second data to the camera hardware abstraction layer 131 through the interface matching module 1321, and then delivers the second data to a sensor to control photographing frame rates of a plurality of cameras according to the decision instruction.

This embodiment of this application provides the photographing frame rate control method. A frame rate strategy decision layer integrated with a plurality of frame rate strategies matching a photographing environment is added to the hardware abstraction layer of the electronic device, so that control over the photographing frame rate can be decoupled from a chip platform, and a frame rate strategy in the frame rate strategy decision layer can be more flexibly and conveniently configured and changed, to meet requirements of more photographing scenes.

A working process of the frame rate strategy decision layer 132 is described below as an example with reference to the accompanying drawings.

Figure 7:
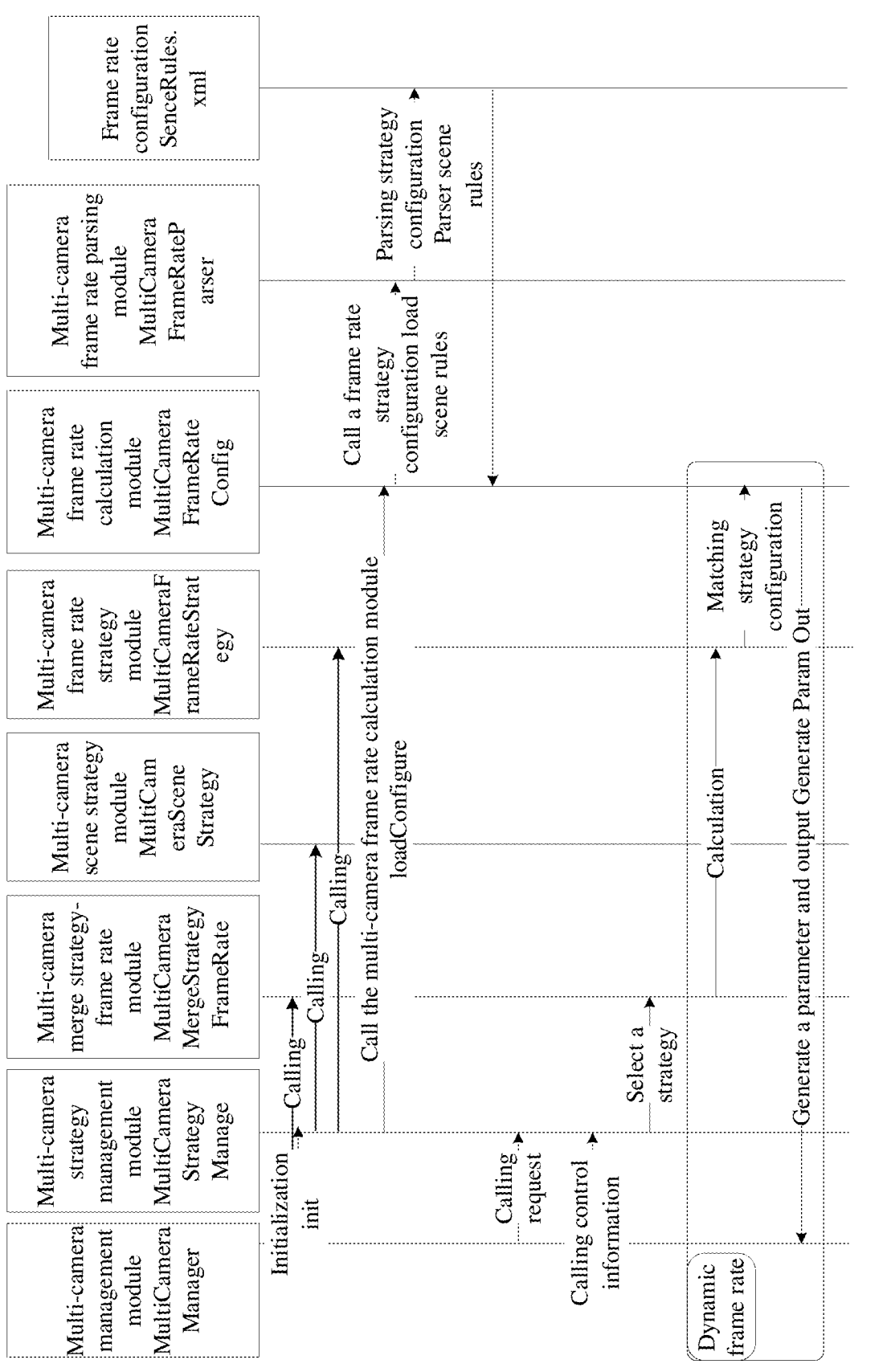
FIG. 7 is a schematic flowchart of another photographing frame rate control method according to an embodiment of this application.

Reference is made to FIG. 7. FIG. 7 is a schematic flowchart of a photographing frame rate control method according to an embodiment of this application. In this embodiment of this application, a process of calling modules inside a frame rate strategy decision layer 132 for controlling a frame rate is implemented. This interaction process may include the following S101 to S107.

S101: A multi-camera management module initializes a multi-camera strategy management module.

S102: The initialized multi-camera management module calls a multi-camera merge strategy-frame rate module, a multi-camera scene strategy module, a multi-camera frame rate strategy module, and a multi-camera frame rate calculation module.

For example, a camera application at an application layer 110 is displayed on a screen of an electronic device 100 in a form of an icon. When an icon of the camera application is tapped by a user to be triggered, the electronic device 100 starts to run the camera application. When the camera application runs on the electronic device 100, the camera application calls a camera access interface corresponding to the camera application at an application framework layer 120, and calls the frame rate strategy decision layer 132 by using a camera hardware abstraction layer 131. The frame rate strategy decision layer 132 performs related initialization, loads a related dynamic frame rate configuration file, and loads and parses a frame rate strategy related file.

Correspondingly, after the frame rate strategy decision layer 132 performs initialization, the camera hardware abstraction layer 131 may be enabled to control a preview interface to display a current photographing mode as a video recording mode, a zoom ratio is 1 time, and a main camera is called to perform collection at a calculated photographing frequency and transmit a collected image to a viewfinder window for display.

S103: The multi-camera frame rate calculation module calls a multi-camera frame rate parsing module.

S104: The multi-camera frame rate parsing module parses a frame rate strategy configuration to obtain a frame rate strategy, and provides the frame rate strategy for the multi-camera frame rate calculation module.

S105: The multi-camera strategy management module invokes a delivered request to be transmitted to an application layer of the multi-camera management module, and control information.

The control information may include a zoom ratio that is changed by a user by sliding or tap-to-switching a zoom bar.

S106: The multi-camera strategy management module selects a frame rate strategy, and provides the frame rate strategy for the multi-camera merge strategy-frame rate module.

S107: The multi-camera frame rate strategy module calculates obtained data based on the provided frame rate strategy, and provides a calculated frame rate result for the multi-camera frame rate calculation module, and the multi-camera frame rate calculation module generates a corresponding parameter and outputs the corresponding parameter to the multi-camera management module.

The foregoing process is merely an example, and a sequence may be specifically adjusted as required. Certainly, steps may be alternatively increased or reduced. This is not limited in this embodiment of this application.

Figure 8:
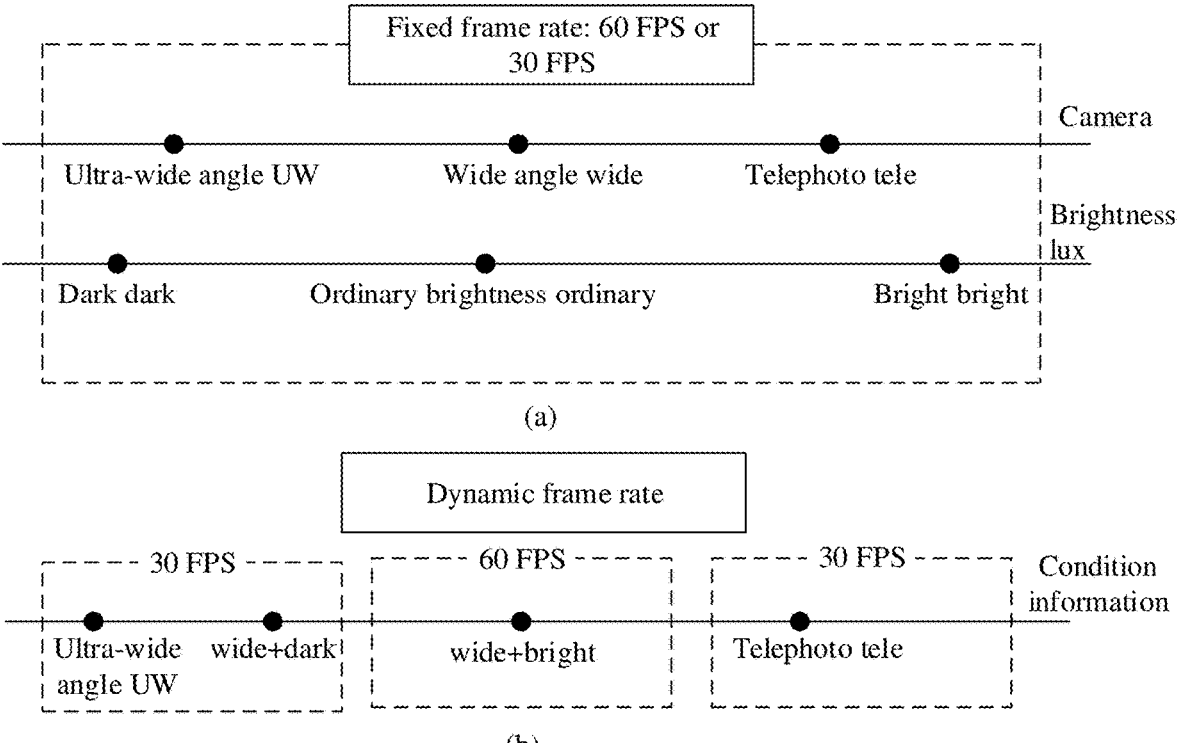
FIG. 8 is a schematic diagram of dynamic frame rate strategy control in an application scenario according to an embodiment of this application.

Reference is made to FIG. 8. FIG. 8 is a schematic diagram of dynamic frame rate strategy control in an application scenario according to an embodiment of this application. As shown in (a) in FIG. 8, regardless of a scheduling mode or a working state of a camera of a camera function or different conditions of brightness lux, a photographing frame rate of the camera is fixed 60 FPS or 30 FPS. Dynamic matching due to a change in a scenario does not occur. An embodiment of this application provides a photographing frame rate control method, and the method may include the following S111 to S118.

S111: A camera application at an application layer 110 is displayed on a screen of an electronic device 100 in a form of an icon. When an icon of the camera application is tapped by a user to be triggered, the electronic device 100 starts to run the camera application.

S112: When the camera application runs on the electronic device 100, the camera application calls a camera access interface corresponding to the camera application at an application framework layer 120, and calls a frame rate strategy decision layer 132 by using a camera hardware abstraction layer 131. The frame rate strategy decision layer 132 performs related initialization, loads a related frame rate strategy configuration file, and loads and parses a frame rate strategy related file.

After the frame rate strategy decision layer 132 performs initialization, for example, the camera hardware abstraction layer 131 may be enabled to control a preview interface to display a current photographing mode as a video recording mode, a zoom ratio is 1 time, and a main camera is called to perform collection at a photographing frequency that matches a photographing scene of wall blocking and transmit a collected image to a viewfinder window for display.

S113: A frame rate strategy calculation module calculates matched condition information based on an ambient brightness value and control data.

S114: The frame rate strategy calculation module matches the condition information with a parsed frame rate strategy to calculate a frame rate result.

S115: The frame rate strategy calculation module determines a target frame rate strategy based on the frame rate result and sensing data.

The frame rate strategy calculation module may calculate, based on an ambient brightness value uploaded by a sensor at a hardware layer and a zoom ratio provided by an application layer, condition information that matches the ambient brightness value and the zoom ratio. As shown in (b) in FIG. 8, the condition information may include information such as ultra-wide-angle UV, wide+dark, wide+bright, or telephoto. A range in which the ambient brightness value is located is determined as dark or bright by calculating the ambient brightness value, and then a used photographing mode is determined based on the zoom ratio, for example, a photographing model such as ultra-wide-angle UV, wide-angle, and telephoto, and then calculated results of the two cases are combined to determine whether wide+dark or wide+bright is matched.

S116: If the calculated condition information meets an ultra-wide-angle mode, a night view mode, or a telephoto mode, a frame rate result calculated by the frame rate strategy calculation module is a first frame rate, for example, 30 FPS shown in (b) in FIG. 8.

S117: If the calculated condition information meets a daylight mode, the frame rate result calculated by the frame rate strategy calculation module is a second frame rate, for example, 60 FPS shown in (b) in FIG. 8.

S118: When the calculated condition information is switched from the ultra-wide angle mode, the night view mode, or the telephoto mode to the daylight mode, switch the target frame rate strategy from a frame rate strategy corresponding to the first frame rate to a frame rate strategy corresponding to the second frame rate.

For example, as shown in (b) in FIG. 8, when the calculated condition information is switched from one case to another photographing scene or mode with a different frame rate, a corresponding photographing frame rate is also controlled to be dynamically switched.

The foregoing process is merely an example, and a sequence may be specifically adjusted as required. For example, the foregoing calculated frame rate result may be alternatively another frame rate, such as 24 frames, 112 frames, or any frame between 30 frames and 60 frames. Specifically, the frame rate may be set based on a requirement of an actual application scenario. Dynamic adjustment and control of the frame rate is merely described as an example in this embodiment of this application. Certainly, steps may also be increased or reduced, and this is not limited in this embodiment of this application.

In some embodiments, the photographing frame rate control method may alternatively include the following S121 to S126.

S121: A camera application at an application layer 110 is displayed on a screen of an electronic device 100 in a form of an icon. When the icon of the camera application is tapped by a user to perform triggering, the electronic device 100 starts to run the camera application.

S122: When the camera application runs on the electronic device 100, the camera application calls a camera access interface corresponding to the camera application at an application framework layer 120, and calls a frame rate strategy decision layer 132 by using a camera hardware abstraction layer 131. The frame rate strategy decision layer 132 performs related initialization, loads a related frame rate strategy configuration file, and loads and parses a frame rate strategy related file.

After the frame rate strategy decision layer 132 performs initialization, for example, the camera hardware abstraction layer 131 may be enabled to control a preview interface to display a current photographing mode as a video recording mode, a zoom ratio is 1 time, and a main camera is called to perform collection at a photographing frequency that matches a photographing scene of wall blocking and transmit a collected image to a viewfinder window for display.

After the camera application is opened, video recording is performed based on a required zoom ratio and/or photographing frame rate, and a process of the camera application is enabled. The camera application schedules and delivers a request, and a hardware abstraction layer 130 obtains, from the request of an upper layer through parsing, control information (for example, a zoom ratio) and scene information that are delivered by the application. A sensor at a hardware layer 150 reports latest sensing data of the sensor to the hardware abstraction layer, performs data conversion on control information and the sensing data of the sensor at an interface matching layer, and converts data into a data format that can be recognized by the frame rate strategy decision layer 132.

S123: Transmit the converted control information and status information to a frame rate strategy calculation module 1323 for calculation.

For example, the frame rate strategy calculation module 1323 calculates, based on a preset brightness threshold, whether an ambient brightness value in current status data meets condition information, for example, whether a current ambient brightness value meets condition information of high brightness or low brightness.

For example, the brightness threshold may be set based on a hardware basis of a camera function, for example, based on a type of the camera. A specific value of the brightness threshold is not limited herein.

For example, the frame rate strategy calculation module 1323 calculates, based on a preset dynamic threshold, whether a dynamic range value in the current status data meets the condition information, for example, whether a dynamic range value of a current photographing environment meets condition information of high dynamic or low dynamic.

For example, the frame rate strategy calculation module 1323 calculates, based on a state uploaded by the sensor, whether the condition information is met, for example, whether a current state of the camera function meets condition information of a jitter state or a still state.

For example, the frame rate strategy calculation module 1323 determines, based on a light state in a scenario uploaded by the sensor, whether the condition information is met, for example, whether light in a current photographing scene meets condition information that light blinks at a high frequency or light is invariant.

S124: A frame rate strategy parsing module 1322 parses and stores a configured dynamic frame rate configuration XML.

For example, the dynamic frame rate configuration XML includes a frame rate strategy corresponding to a photographing scene including various condition information or a combination of the condition information.

S125: The frame rate strategy calculation module 1323 performs matching calculation on the matched condition information and the parsed frame rate strategy corresponding to the photographing scene, integrates an output frame rate result and a state of the camera function, and outputs a final decision result and a target frame rate strategy.

S126: The frame rate strategy control module generates a decision instruction based on the target frame rate strategy, and outputs the decision instruction through an interface matching module 1321.

The interface matching module 1321 outputs the decision instruction to a media control layer 1312 of a camera hardware abstraction layer 131, and the media control layer 1312 adds the decision instruction to a request and transmits the request to a chip platform. The chip platform then delivers the request to a driver layer 140 to control photographing frame rates of a plurality of cameras according to the decision instruction, so that the camera function implements dynamic matching and adjustment and control of a photographing frame rate in different photographing scenes.

In some embodiments, the frame rate strategy decision layer may further determine the target frame rate strategy based on sensing data, control data, and power consumption information. The power consumption information may be status information of the sensor, that is, algorithm power consumption of a sensor corresponding to a current photographing mode, for example, algorithm power consumption corresponding to a night view mode. The frame rate strategy decision layer 132 may further perform dynamic frame rate matching and adjustment and control with reference to power consumption information required by the current photographing scene, to achieve better balance between a photographing effect and running power consumption.

It should be noted that the foregoing condition information is merely an example for description, and a photographing scene corresponding to each piece of condition information or a combination of the condition information may be expanded or matched based on an actual application scenario, and is not specifically limited herein.

The foregoing process is merely an example, and a sequence may be specifically adjusted as required. Certainly, steps may be alternatively increased or reduced. This is not limited in this embodiment of this application.

The photographing frame rate control method and the related display interface that are provided in the embodiments of this application are described in detail above with reference to FIG. 1A and FIG. 1B to FIG. 9. An electronic device and a chip that are provided in the embodiments of this application are described below with reference to FIG. 11 and FIG. 12. It should be understood that the electronic device and the chip in the embodiments of this application may perform the photographing frame rate control methods in the foregoing embodiments of this application. To be specific, for specific work processes of following products, refer to corresponding processes in the foregoing method embodiments.

Figure 11:
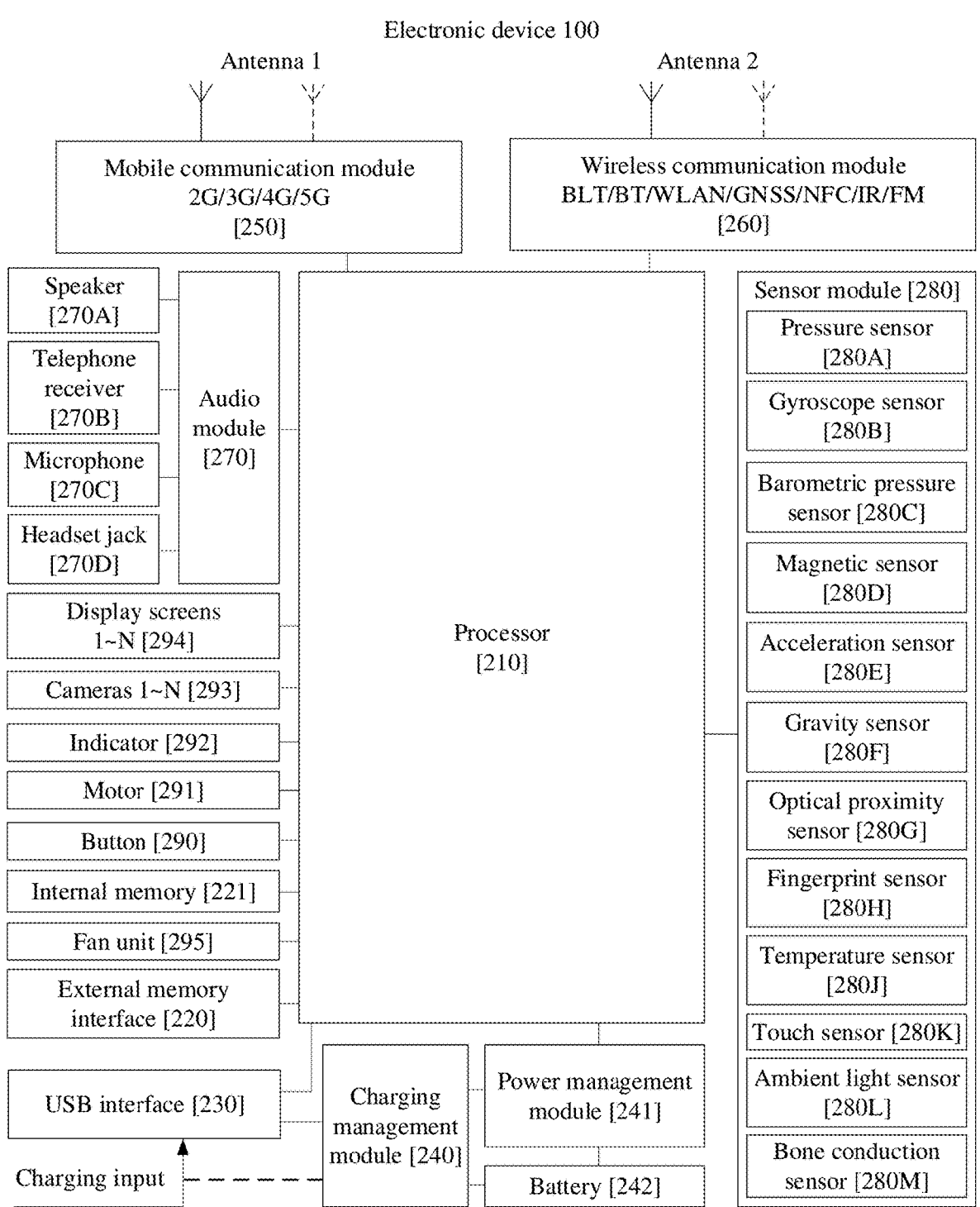
FIG. 11 is a diagram of an architecture of a hardware system of an electronic device according to an embodiment of this application.

FIG. 11 shows a hardware system of an electronic device applicable to this application. An electronic device 100 may be configured to implement the photographing frame rate control method described in the foregoing method embodiments.

The electronic device 100 may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a telephone receiver 270B, a microphone 270C, a headset jack 270D, a sensor module 280, a button 290, a motor 291, an indicator 292, a camera 293, a display screen 294, a fan unit 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure illustrated in this embodiment of this application constitutes no specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a timing signal, to complete control of instruction fetching and instruction execution.

A memory may be further disposed in the processor 210 to store instructions and data. In some embodiments, the memory in the processor 210 is a cache. The memory may store instructions or data recently used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In this embodiment of this application, the processor 210 may display a display interface (a home screen or a preview interface), where the display interface may include a first control (for example, the home screen may include a camera control, and the preview interface may include a zoom control); detect a first operation on the first control; determine a target frame rate strategy based on initial data in response to the first operation; and then, determine a decision instruction based on the target frame rate strategy, to dynamically modulate a photographing frame rate of a camera function in a photographing scene.

A connection relationship between the modules shown in FIG. 11 is merely an example for description and does not constitute a limitation on the connection relationship between the modules of the electronic device 100. Optionally, the modules of the electronic device 100 may alternatively use a combination of a plurality of connection manners in the foregoing embodiments.

A wireless communication function of the electronic device 100 may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used together with a tuning switch.

The mobile communication module 250 may provide a solution for wireless communication including 2G/3G/4G/ 5G and the like applied to the electronic device 100. The mobile communication module 250 may include at least one filter, switch, power amplifier, low noise amplifier (low noise amplifier, LNA), and the like. The mobile communication module 250 may receive an electromagnetic wave through the antenna 1, perform processing such as filtering and amplification on the received electromagnetic wave, and send a processed electromagnetic wave to the modem processor for demodulation. The mobile communication module 250 may further amplify a signal modulated by the modem processor, and convert the signal into an electromagnetic wave by using the antenna 1 for radiation. In some embodiments, at least some functional modules of the mobile communication module 250 may be disposed in the processor 210. In some embodiments, at least some functional modules of the mobile communication module 250 may be disposed in a same component as at least some modules of the processor 210.

The electronic device 100 may implement a display function by using the GPU, the display screen 294, the application processor, and the like. The GPU is a microprocessor for image processing and connects the display screen 294 and the application processor. The GPU is configured to perform mathematical and geometric computing for graphics rendering. The processor 210 may include one or more GPUs that execute program instructions to generate or change displayed information.

The display screen 294 is configured to display an image, a video, and the like. The display screen 294 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N display screens 294, where N is a positive integer greater than 1.

The electronic device 100 may implement a photographing function by using the ISP, the camera 293, the video codec, the GPU, the display screen 294, an application processor, and the like.

The ISP is configured to process data fed back by the camera 293. For example, during photographing, a shutter is opened, and light is transmitted to a camera photosensitive element through a lens. An optical signal is converted into an electrical signal. The camera photosensitive element transmits the electrical signal to the ISP for processing, to convert the electrical signal into an image visible to naked eyes. The ISP may further perform algorithm optimization on noise, brightness, and complexion of the image. The ISP may further optimize parameters such as exposure and color temperature of a photographing scene. In some embodiments, the ISP may be disposed in the camera 293.

The camera 293 is configured to capture a still image or a video. An optical image of an object is generated through the lens and is projected onto a photosensitive element. The photosensitive element may be a charge coupled device (charge coupled device, CCD) or a complementary metaloxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 293, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG2, MPEG3, and MPEG4.

The electronic device 100 may implement an audio function by using the audio module 270, the speaker 270A, the telephone receiver 270B, the microphone 270C, the headset jack 270D, the application processor, and the like, for example, implement music playing and audio recording.

The pressure sensor 280A is configured to sense a pressure signal, and may convert the pressure signal into an electrical signal. In some embodiments, the pressure sensor 280A may be disposed in the display screen 294. There are various types of pressure sensors 280A, for example, a resistive pressure sensor, an inductive pressure sensor, and a capacitive pressure sensor. The capacitive pressure sensor may include at least two parallel plates having an electrically conductive material. When force is applied onto the pressure sensor 280A, a capacitance between electrodes changes. The electronic device 100 determines intensity of pressure based on a change in the capacitance. When a touch operation is performed on the display screen 294, the electronic device 100 detects intensity of the touch operation by using the pressure sensor 280A. The electronic device 100 may also calculate a touch position based on a detected signal of the pressure sensor 280A. In some embodiments, touch operations performed at a same touch position but having different touch operation strength may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 280B may be configured to determine a motion posture of the electronic device 100. In some embodiments, angular velocities of the electronic device 100 around three axes (that is, an x axis, a y axis, and a z axis) may be determined by using the gyroscope sensor 280B. The gyroscope sensor 280B may be configured to implement image stabilization during photographing. For example, when the shutter is pressed, the gyroscope sensor 280B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 280B may be further used for navigation and a somatosensory game scenario. The gyroscope sensor may further detect a state of the electronic device in a photographing process, for example, a moving photographing state or a still photographing state.

The acceleration sensor 280E may detect magnitudes of acceleration in various directions (usually on three axes) of the electronic device 100, and may detect a magnitude and a direction of gravity when the electronic device 100 is still. The acceleration sensor 280E may be further configured to identify a posture of the electronic device, and is applied to applications such as switching between a landscape mode and a portrait mode and a pedometer.

The distance sensor 280F is configured to measure a distance. The electronic device 100 may measure a distance in an infrared or laser manner. In some embodiments, in a photographing scene, the electronic device 100 may measure a distance by using the distance sensor 280F, to implement fast focusing.

The optical proximity sensor 280G may include, for example, a light-emitting diode (LED) and an optical detector, for example, a photodiode. The light-emitting diode may be an infrared light-emitting diode. The electronic device 100 emits infrared light to the outside by using the light-emitting diode. The electronic device 100 uses the photodiode to detect reflected infrared light from a nearby object. When abundant reflected light is detected, it may be determined that there is an object near the electronic device 100. When insufficient reflected light is detected, the electronic device 100 may determine that there is no object near the electronic device 100. The electronic device 100 may detect, by using the optical proximity sensor 280G, that a user holds the electronic device 100 close to an ear for a call, to implement automatic screen-off to save power. The optical proximity sensor 280G may also be used for automatically unlocking and locking a screen in a flip case mode and a pocket mode.

The ambient light sensor 280L is configured to sense brightness of ambient light. The electronic device 100 may adaptively adjust brightness of the display screen 294 based on the sensed brightness of the ambient light. The ambient light sensor 280L may also be configured to automatically adjust white balance during photographing. The ambient light sensor 280L may further cooperate with the optical proximity sensor 280G to detect whether the electronic device 100 is in a pocket to prevent accidental touch.

The fingerprint sensor 280H is configured to collect a fingerprint. The electronic device 100 may implement fingerprint unlocking, application lock accessing, fingerprint-based photographing, fingerprint-based call answering, and the like by using a feature of the collected fingerprint.

The temperature sensor 280J is configured to detect temperature. In some embodiments, the electronic device 100 executes a temperature processing strategy by using the temperature detected by the temperature sensor 280J. For example, when the temperature reported by the temperature sensor 280J exceeds a threshold, the electronic device 100 degrades performance of a processor located near the temperature sensor 280J, to reduce power consumption and implement thermal protection. In some other embodiments, when the temperature is less than another threshold, the electronic device 100 heats the battery 242, to prevent the electronic device 100 from being abnormally powered off due to the low temperature. In some other embodiments, when the temperature is lower than still another threshold, the electronic device 100 boosts an output voltage of the battery 242, to avoid abnormal power-off caused by low temperature.

The touch sensor 280K is also referred to as a "touch component". The touch sensor 280K may be disposed on the display screen 294. The touch sensor 280K and the display screen 294 constitute a touchscreen that is also referred to as a "touch control screen". The touch sensor 280K is configured to detect a touch operation on or near the touch sensor 280K. The touch sensor may transmit a detected touch operation to the application processor to determine a type of a touch event. Visual output related to the touch operation may be provided by using the display screen 294. In some other embodiments, the touch sensor 280K may alternatively be disposed on a surface of the electronic device 100, at a position different from that of the display screen 294.

It should be noted that the foregoing structure of the electronic device is merely an example for description. Based on different application scenarios, the electronic device may further include another entity structure. An entity structure of the electronic device is not limited herein.

An embodiment of this application further provides a computer program product including computer instructions. When the computer program product runs on an electronic device 100, the electronic device 100 may be enabled to perform the foregoing photographing frame rate control method.

Figure 12:
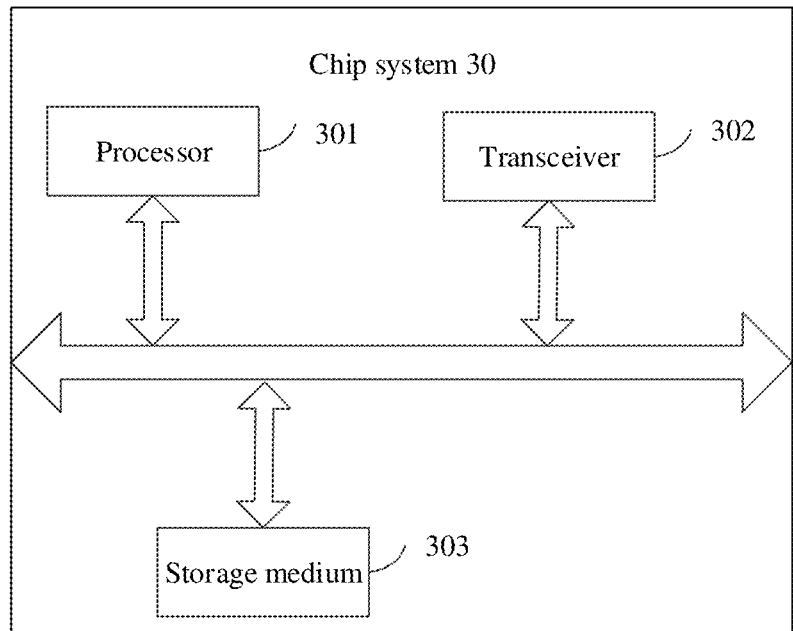
FIG. 12 is a schematic diagram of a structure of a chip system according to an embodiment of this application.

FIG. 12 is a schematic diagram of a structure of a chip system according to an embodiment of this application. A chip system 30 shown in FIG. 12 may be a general-purpose processor or a special-purpose processor. The chip system 30 includes a processor 301. The processor 301 is configured to support the electronic device 100 in executing the foregoing technical solutions.

Optionally, the chip system further includes a transceiver 302. The transceiver 302 is configured to be controlled by the processor 301 to support the electronic device 100 in executing the foregoing technical solutions.

Optionally, the chip system shown in FIG. 12 may further include a storage medium 303.

It should be noted that the chip system shown in FIG. 12 may be implemented by using the following circuit or component: one or more field programmable gate arrays (field programmable gate array, FPGA), a programmable logic device (programmable logic device, PLD), a controller, a state machine, gate logic, a discrete hardware component, any other suitable circuit, or any combination of circuits that can perform various functions described throughout this application.

The electronic device, the computer storage medium, the computer program product, and the chip system provided in the embodiments of this application are all configured to perform the method provided above. Therefore, for beneficial effects achieved by the computer storage medium, the computer program product, and the chip system provided in the embodiments of this application, refer to beneficial effects corresponding to the method provided above. Details are not described herein again.

It should be understood that the foregoing descriptions are intended to help a person skilled in the art better understand the embodiments of this application, but not to limit the scope of the embodiments of this application. A person skilled in the art may obviously perform various equivalent modifications or changes based on the foregoing examples. For example, some steps in the foregoing embodiments of the detection method may be unnecessary, or some new steps may be added. Alternatively, any two or more of the foregoing embodiments may be combined. Such modifications, changes, or combined solutions also fall within the scope of the embodiments of this application.

It should be further understood that the foregoing descriptions of the embodiments of this application focuses on highlighting differences between the embodiments. For same or similar parts that are not mentioned, reference may be made to each other. For brevity, details are not described herein.

It should be further understood that sequence numbers of the processes do not mean execution sequences. The execution sequences of the processes should be determined based on functions and internal logic of the processes, and should not be construed as any limitation on the implementation processes of the embodiments of this application.

It should be further understood that in the embodiments of this application, "preset" or "predefined" may be implemented by pre-storing a corresponding code or table in a device (for example, including an electronic device), or implemented in a manner that can be used to indicate related information. A specific implementation of "preset" or "predefined" is not limited in this application.

It should be further understood that division of the manners, cases, categories, and embodiments in the embodiments of this application are merely for convenience of description, and should not constitute a special limitation. Various manners, categories, cases, and features in the embodiments may be combined when there is no contradiction.

It should be further understood that in the embodiments of this application, if no special description or logic conflict exists, terms and/or descriptions of different embodiments are consistent and can be mutually referenced, and technical features of different embodiments may be combined based on an internal logical relationship between the different embodiments to form a new embodiment.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A photographing frame rate control method, applied to an electronic device comprising a frame rate strategy decision layer and a plurality of cameras, wherein the method comprises:

detecting, by the electronic device, a first operation on a first control in a display interface;

determining, by the frame rate strategy decision layer, a target frame rate strategy based on initial data in response to the first operation, wherein the initial data comprises sensing data, the sensing data comprises at least one of an ambient brightness value, a dynamic range value, status information, or a scene type;

determining, by the frame rate strategy decision layer, a target frame rate strategy based on initial data in response to the first operation comprises:

if the ambient brightness value is greater than the brightness threshold, the dynamic range value is greater than the dynamic threshold, the status information is a still state, and the scene type is a light invariant scene, using the first strategy in the plurality of frame rate strategies as the target frame rate strategy, wherein the first strategy is a high-quality low-frame strategy;

if the ambient brightness value is greater than the brightness threshold, the dynamic range value is less than or equal to the dynamic threshold, the status information is a still state, and the scene type is a light blinking scene, using a second strategy in the plurality of frame rate strategies as the target frame rate strategy, wherein the second strategy is a low-quality high-frame strategy; or if the ambient brightness value is greater than a brightness threshold, the dynamic range value is less than or equal to a dynamic threshold, and the status information is a jitter state, using a third strategy in the plurality of frame rate strategies as the target frame rate strategy, wherein the third strategy is a low-quality low-frame strategy; and generating, by the frame rate strategy decision layer, a decision instruction based on the target frame rate strategy, wherein the decision instruction is used to control photographing frame rates of the plurality of cameras.

2. The method according to claim 1, wherein the frame rate strategy decision layer comprises an interface matching module, a frame rate strategy calculation module, and a frame rate strategy control module that are connected in sequence, the interface matching module is further connected to the frame rate strategy control module, the frame rate strategy decision layer further comprises a frame rate strategy parsing module, and the frame rate strategy parsing module is connected to the frame rate strategy calculation module; and the method comprises:

obtaining, by the interface matching module, the initial data, wherein the initial data comprises at least one of sensing data or control data;

parsing, by the frame rate strategy parsing module, a frame rate strategy configuration to obtain a plurality of frame rate strategies;

determining, by the frame rate strategy calculation module from the plurality of frame rate strategies based on the initial data, the target frame rate strategy that matches the initial data, wherein the target frame rate strategy is one of the plurality of frame rate strategies;

generating, by the frame rate strategy control module, the decision instruction based on the target frame rate strategy; and outputting, by the interface matching module, the decision instruction.

3. The method according to claim 2, wherein the frame rate strategy decision layer further comprises a first conversion module and a second conversion module, the first conversion module is connected between the interface matching module and the frame rate strategy calculation module, and the second conversion module is connected between the interface matching module and the frame rate strategy control module;

after the obtaining, by the interface matching module, the initial data, the method further comprises:

converting, by the first conversion module, the initial data into first data; and after the generating, by the frame rate strategy control module, the decision instruction based on the target frame rate strategy, the method further comprises:

converting, by the second conversion module, the decision instruction into second data; and outputting, by the interface matching module, the second data.

4. The method according to claim 3, the determining, by the frame rate strategy decision layer, a target frame rate strategy based on initial data comprises:

calculating, by the frame rate strategy calculation module, matched photographing mode based on the ambient brightness value and the control data;

matching, by the frame rate strategy calculation module, the condition information with the parsed frame rate strategy, and calculating a frame rate result; and determining, by the frame rate strategy calculation module, the target frame rate strategy based on the frame rate result and the sensing data.

5. The method according to claim 4, wherein the photographing mode comprises at least one of an ultra-wide angle mode, a night view mode, a daylight mode, or a telephoto mode;

if the photographing mode is the ultra-wide angle mode, the night view mode, or the telephoto mode, the frame rate result calculated by the frame rate strategy calculation module is a first frame rate; and if the photographing mode is the daylight mode, the frame rate result calculated by the frame rate strategy calculation module is a second frame rate.

6. The method according to claim 5, wherein when the calculated photographing mode is switched from the ultra-wide angle mode, the night view mode, or the telephoto mode to the daylight mode, the target frame rate strategy is switched from a frame rate strategy corresponding to the first frame rate to a frame rate strategy corresponding to the second frame rate.

7. The method according to claim 6, wherein the determining, by the frame rate strategy decision layer, a target frame rate strategy based on initial data comprises:

if the ambient brightness value is greater than a brightness threshold, the dynamic range value is greater than a dynamic threshold, and the status information is a jitter state, using a first strategy in the plurality of frame rate strategies as the target frame rate strategy; or if the ambient brightness value is greater than the brightness threshold, the dynamic range value is greater than the dynamic threshold, the status information is a still state, and the scene type is a light blinking scene, using a second strategy in the plurality of frame rate strategies as the target frame rate strategy.

8. The method according to claim 6, wherein the determining, by the frame rate strategy decision layer, a target frame rate strategy based on initial data comprises:

if the ambient brightness value is greater than the brightness threshold, the dynamic range value is less than or equal to the dynamic threshold, the status information is a still state, and the scene type is a light invariant scene, using a third strategy in the plurality of frame rate strategies as the target frame rate strategy.

9. The method according to claim 6, wherein the determining, by the frame rate strategy decision layer, a target frame rate strategy based on initial data comprises:

if the ambient brightness value is less than or equal to a brightness threshold, using a third strategy in the plurality of frame rate strategies as the target frame rate strategy.

10. The method according to claim 9, wherein the initial data further comprises power consumption information; and the determining, by the frame rate strategy decision layer, a target frame rate strategy based on initial data comprises:

determining, by the frame rate strategy decision layer, the target frame rate strategy based on the sensing data, the control data, and the power consumption information.

11. The method according to claim 1, wherein the dynamic range value is used to represent information about a proportion of an overexposed area in an entire preview image obtained by a camera.

12. An electronic device, comprising a memory and a plurality of cameras, wherein the memory is configured to store a computer instructions; and when the electronic device executes the computer instructions, the electronic device performs the following operations:

detecting, by the electronic device, a first operation on a first control in a display interface;

determining, by the frame rate strategy decision layer, a target frame rate strategy based on initial data in response to the first operation, wherein the initial data comprises sensing data, the sensing data comprises at least one of an ambient brightness value, a dynamic range value, status information, or a scene type;

determining, by the frame rate strategy decision layer, a target frame rate strategy based on initial data in response to the first operation comprises: if the ambient brightness value is greater than the brightness threshold, the dynamic range value is greater than the dynamic threshold, the status information is a still state, and the scene type is a light invariant scene, using the first strategy in the plurality of frame rate strategies as the target frame rate strategy, wherein the first strategy is a high-quality low-frame strategy;

if the ambient brightness value is greater than the brightness threshold, the dynamic range value is less than or equal to the dynamic threshold, the status information is a still state, and the scene type is a light blinking scene, using a second strategy in the plurality of frame rate strategies as the target frame rate strategy, wherein the second strategy is a low-quality high-frame strategy; or if the ambient brightness value is greater than a brightness threshold, the dynamic range value is less than or equal to a dynamic threshold, and the status information is a jitter state, using a third strategy in the plurality of frame rate strategies as the target frame rate strategy, wherein the third strategy is a low-quality low-frame strategy; and generating, by the frame rate strategy decision layer, a decision instruction based on the target frame rate strategy, wherein the decision instruction is used to control photographing frame rates of the plurality of cameras.

13. The electronic device according to claim 12, wherein the electronic device performs the following operations:

obtaining, by the electronic device, the initial data, wherein the initial data comprises at least one of sensing data or control data;

parsing, by the electronic device, a frame rate strategy configuration to obtain a plurality of frame rate strategies;

determining, by the electronic device from the plurality of frame rate strategies based on the initial data, the target frame rate strategy that matches the initial data, wherein the target frame rate strategy is one of the plurality of frame rate strategies;

generating, by the electronic device, the decision instruction based on the target frame rate strategy; and outputting, by the electronic device, the decision instruction.

14. The electronic device according to claim 13, wherein the electronic device performs the following operations:

converting, by the electronic device, the initial data into first data; and after the generating, by the electronic device, the decision instruction based on the target frame rate strategy, the electronic device further performs the following operations:

converting, by the electronic device, the decision instruction into second data; and outputting, by the electronic device, the second data.

15. The electronic device according to claim 14, wherein the determining, by the electronic device, a target frame rate strategy based on initial data comprises:

calculating, by the electronic device, matched photographing mode based on the ambient brightness value and the control data;

matching, by the electronic device, the condition information with the parsed frame rate strategy, and calculating a frame rate result; and determining, by the electronic device, the target frame rate strategy based on the frame rate result and the sensing data.

16. The electronic device according to claim 15, wherein the photographing mode comprises at least one of an ultra-wide angle mode, a night view mode, a daylight mode, or a telephoto mode;

if the photographing mode is the ultra-wide angle mode, the night view mode, or the telephoto mode, the frame rate result calculated by the frame rate strategy calculation module is a first frame rate; and if the photographing mode is the daylight mode, the frame rate result calculated by the frame rate strategy calculation module is a second frame rate.

17. The electronic device according to claim 16, wherein when the calculated photographing mode is switched from the ultra-wide angle mode, the night view mode, or the telephoto mode to the daylight mode, the target frame rate strategy is switched from a frame rate strategy corresponding to the first frame rate to a frame rate strategy corresponding to the second frame rate.

18. The electronic device according to claim 17, wherein the determining, by the frame rate strategy decision layer, a target frame rate strategy based on initial data comprises:

if the ambient brightness value is greater than a brightness threshold, the dynamic range value is greater than a dynamic threshold, and the status information is a jitter state, using a first strategy in the plurality of frame rate strategies as the target frame rate strategy; or if the ambient brightness value is greater than the brightness threshold, the dynamic range value is greater than the dynamic threshold, the status information is a still state, and the scene type is a light blinking scene, using a second strategy in the plurality of frame rate strategies as the target frame rate strategy.

19. The electronic device according to claim 17, wherein the determining, by the frame rate strategy decision layer, a target frame rate strategy based on initial data comprises:

if the ambient brightness value is greater than the brightness threshold, the dynamic range value is less than or equal to the dynamic threshold, the status information is a still state, and the scene type is a light invariant scene, using a third strategy in the plurality of frame rate strategies as the target frame rate strategy.

20. A non-transitory computer-readable storage medium, wherein the computer-readable storage medium stores a computer program, and when the computer program is executed on an electronic device, the electronic device performs the following operations:

detecting, by the electronic device, a first operation on a first control in a display interface;

determining, by the frame rate strategy decision layer, a target frame rate strategy based on initial data in response to the first operation, wherein the initial data comprises sensing data, the sensing data comprises at least one of an ambient brightness value, a dynamic range value, status information, or a scene type;

determining, by the frame rate strategy decision layer, a target frame rate strategy based on initial data in response to the first operation comprises: if the ambient brightness value is greater than the brightness threshold, the dynamic range value is greater than the dynamic threshold, the status information is a still state, and the scene type is a light invariant scene, using the first strategy in the plurality of frame rate strategies as the target frame rate strategy, wherein the first strategy is a high-quality low-frame strategy;

if the ambient brightness value is greater than the brightness threshold, the dynamic range value is less than or equal to the dynamic threshold, the status information is a still state, and the scene type is a light blinking scene, using a second strategy in the plurality of frame rate strategies as the target frame rate strategy, wherein the second strategy is a low-quality high-frame strategy; or if the ambient brightness value is greater than a brightness threshold, the dynamic range value is less than or equal to a dynamic threshold, and the status information is a jitter state, using a third strategy in the plurality of frame rate strategies as the target frame rate strategy, wherein the third strategy is a low-quality low-frame strategy; and generating, by the frame rate strategy decision layer, a decision instruction based on the target frame rate strategy, wherein the decision instruction is used to control photographing frame rates of the plurality of cameras.

* * * * *